US012757844B2

(12) United States Patent
Lankford

(10) Patent No.: US 12,757,844 B2
(45) **Date of Patent: *Oct. 13, 2026**

(54) CROP-SPECIFIC AUTOMATED IRRIGATION AND NUTRIENT MANAGEMENT

(71) Applicant: Earthtec Solutions LLC, Vineland, NJ (US)

(72) Inventor: David Lankford, Vineland, NJ (US)

(73) Assignee: Earthtec Solutions LLC, Vineland, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/052,978

(22) Filed: Feb. 13, 2025

(65) Prior Publication Data

US 2025/0255232 A1 Aug. 14, 2025

Related U.S. Application Data

(63) Continuation of application No. 18/054,662, filed on Nov. 11, 2022, now Pat. No. 12,256,680, which is a (Continued)

(51) Int. Cl.
*A01G 25/16* (2006.01)

(52) U.S. Cl.
CPC .............. *A01G 25/16* (2013.01); *Y02A 40/10* (2018.01); *Y02A 40/22* (2018.01)

(58) Field of Classification Search
CPC ......... A01G 25/16; Y02A 40/10; Y02A 40/22
See application file for complete search history.

(56) References Cited

U.S. PATENT DOCUMENTS 3,493,176 A 2/1970 Kinkead
3,508,148 A 4/1970 Enfield
(Continued)

FOREIGN PATENT DOCUMENTS

CA 2987761 A1 6/2019
WO 9103156 A1 3/1991
(Continued)

OTHER PUBLICATIONS

U.S. Appl. No. 18/054,662 (U.S. Pat. No. 12,256,680), filed Nov. 11, 2022 (Mar. 25, 2025), David Lankford (Earthtec Solutions LLC).
(Continued)

*Primary Examiner* — Ebony E Evans
(74) *Attorney, Agent, or Firm* — Ballard Spahr LLP

(57) ABSTRACT

Embodiments for crop-specific automated irrigation of an environmental medium and management of nutrients therein. In one aspect, operation of an irrigation apparatus can be regulated according to specific water demand of a crop. The water demand can be assessed by evaluating water content conditions of the environmental medium comprising the crop, medium characteristics, and/or nutrient delivery and transport characteristics at the medium. Regulation of operation of the irrigation apparatus can comprise control of one or more of water supply to the apparatus, positioning and/or movement of the irrigation apparatus, or configuration of sensing devices for collection of information suitable for such regulation.

20 Claims, 28 Drawing Sheets

Related U.S. Application Data continuation of application No. 16/667,475, filed on Oct. 29, 2019, now Pat. No. 11,523,571, which is a continuation of application No. 14/232,768, filed as application No. PCT/US2012/046980 on Jul. 16, 2012, now Pat. No. 10,512,226.

(60) Provisional application No. 61/508,215, filed on Jul. 15, 2011.

(56) References Cited

U.S. PATENT DOCUMENTS

| | | | |
|---|---|---|---|
| 3,669,353 A | | 6/1972 | Hanson et al. |
| 3,680,778 A | | 8/1972 | Sisson et al. |
| 3,901,442 A | | 8/1975 | Chapman |
| 3,967,198 A | | 6/1976 | Gensler |
| 4,140,421 A | | 2/1979 | Lloyd |
| 4,161,292 A | | 7/1979 | Holloway et al. |
| 4,209,035 A | | 6/1980 | Hait |
| 4,216,789 A | * | 8/1980 | Hasenbeck .......... A01G 25/167 324/696 |
| RE31,023 E | | 9/1982 | Hall, III |
| 4,545,396 A | | 10/1985 | Miller et al. |
| 4,567,563 A | | 1/1986 | Hirsch |
| 5,251,153 A | | 10/1993 | Nielsen et al. |
| 5,293,554 A | | 3/1994 | Nicholson |
| 5,405,425 A | | 4/1995 | Pieh et al. |
| 5,696,671 A | | 12/1997 | Oliver |
| 5,739,031 A | | 4/1998 | Runyon |
| 5,740,031 A | | 4/1998 | Gagnon |
| 5,870,302 A | | 2/1999 | Oliver |
| 5,884,224 A | | 3/1999 | McNabb et al. |
| 5,927,603 A | * | 7/1999 | McNabb .............. A01G 25/167 239/69 |
| 5,931,882 A | | 8/1999 | Fick et al. |
| 6,055,480 A | | 4/2000 | Nevo et al. |
| 6,178,253 B1 | | 1/2001 | Hendrickson et al. |
| 6,236,907 B1 | | 5/2001 | Hauwiller et al. |
| 6,530,160 B1 | | 3/2003 | Gookins |
| 7,039,523 B2 | | 5/2006 | Bell |
| 7,231,298 B2 | | 6/2007 | Hnilica-Maxwell |
| 7,349,763 B2 | | 3/2008 | Ivans |
| 7,877,168 B1 | | 1/2011 | Porter et al. |
| 7,949,433 B2 | | 5/2011 | Hern et al. |
| 8,191,307 B2 | | 6/2012 | Donoghue et al. |
| 8,200,368 B2 | | 6/2012 | Nickerson et al. |
| 8,219,254 B2 | | 7/2012 | O'Connor |
| 8,289,035 B1 | | 10/2012 | Gensler |
| 8,682,494 B1 | | 3/2014 | Magro et al. |
| 8,793,024 B1 | | 7/2014 | Woytowitz et al. |
| 10,512,226 B2 | * | 12/2019 | Lankford ............. A01G 25/092 |
| 11,523,571 B2 | * | 12/2022 | Lankford ............. A01G 25/092 |
| 12,256,680 B2 | * | 3/2025 | Lankford ............... A01G 25/16 |
| 2002/0014539 A1 | | 2/2002 | Pagano et al. |
| 2002/0173980 A1 | | 11/2002 | Daggett et al. |
| 2002/0183935 A1 | | 12/2002 | Skinner |
| 2003/0009799 P1 | | 1/2003 | Khanizadeh |
| 2003/0042916 A1 | | 3/2003 | Anderson |
| 2003/0109964 A1 | | 6/2003 | Addink et al. |
| 2003/0182259 A1 | | 9/2003 | Pickett et al. |
| 2003/0200028 A1 | | 10/2003 | Rooney et al. |
| 2004/0088330 A1 | | 5/2004 | Pickett et al. |
| 2004/0145379 A1 | | 7/2004 | Buss |
| 2005/0015287 A1 | | 1/2005 | Beaver |
| 2005/0156066 A1 | | 7/2005 | Ivans |
| 2005/0216130 A1 | | 9/2005 | Clark et al. |
| 2005/0248455 A1 | | 11/2005 | Pope et al. |
| 2005/0257748 A1 | | 11/2005 | Kriesel et al. |
| 2006/0010967 A1 | | 1/2006 | Matsuo |
| 2006/0102739 A1 | | 5/2006 | Ivans |
| 2006/0131442 A1 | | 6/2006 | Ivans |
| 2006/0271555 A1 | | 11/2006 | Beck et al. |
| 2007/0016334 A1 | | 1/2007 | Smith et al. |
| 2007/0055407 A1 | * | 3/2007 | Goldberg ............ A01G 25/167 345/530 |
| 2008/0097653 A1 | | 4/2008 | Kaprielian et al. |
| 2008/0142614 A1 | | 6/2008 | Elezaby |
| 2008/0199359 A1 | | 8/2008 | Davis et al. |
| 2009/0120506 A1 | | 5/2009 | Hoch |
| 2009/0138105 A1 | | 5/2009 | Crawford |
| 2009/0177330 A1 | | 7/2009 | Kah, Jr. |
| 2009/0216661 A1 | | 8/2009 | Warner |
| 2009/0229179 A1 | | 9/2009 | Hafeel et al. |
| 2009/0277506 A1 | | 11/2009 | Bradbury et al. |
| 2010/0030389 A1 | | 2/2010 | Palmer et al. |
| 2010/0030476 A1 | | 2/2010 | Woytowitz et al. |
| 2010/0036912 A1 | | 2/2010 | Rao |
| 2010/0038440 A1 | | 2/2010 | Ersavas |
| 2010/0094472 A1 | | 4/2010 | Woytowitz et al. |
| 2010/0109685 A1 | | 5/2010 | Morton |
| 2011/0004578 A1 | | 1/2011 | Momma et al. |
| 2011/0035059 A1 | | 2/2011 | Ersavas |
| 2011/0093123 A1 | | 4/2011 | Alexanian |
| 2011/0179978 A1 | | 7/2011 | Schmitt |
| 2012/0239211 A1 | | 9/2012 | Walker et al. |
| 2012/0261486 A1 | | 10/2012 | Sarver et al. |
| 2012/0284264 A1 | | 11/2012 | Lankford et al. |
| 2014/0236868 A1 | | 8/2014 | Cook |
| 2016/0205877 A1 | | 7/2016 | Rooney et al. |
| 2016/0247079 A1 | | 8/2016 | Mewes et al. |
| 2017/0273258 A1 | | 9/2017 | Itzhaky et al. |
| 2023/0153926 A1 | * | 5/2023 | Daugherty ............ G06Q 50/02 702/2 |

FOREIGN PATENT DOCUMENTS

| | | | |
|---|---|---|---|
| WO | 9522799 | A1 | 8/1995 |
| WO | 20000015987 | A1 | 3/2000 |
| WO | 20030099454 | A2 | 12/2003 |
| WO | 2012142050 | A1 | 10/2012 |
| WO | 2016154482 | A1 | 9/2016 |

OTHER PUBLICATIONS

U.S. Appl. No. 16/667,475 (U.S. Pat. No. 11,523,571), filed Oct. 29, 2019 (Dec. 13, 2022), David Lankford (Earthtec Solutions LLC).
U.S. Appl. No. 14/232,768 (U.S. Pat. No. 10,512,226), filed Sep. 17, 2014 (Dec. 24, 2019), David Lankford (Earthtec Solutions LLC).
PCT/US12/46980 (WO2013/012826), filed Jul. 16, 2012 (Jan. 24, 2013), David Lankford (Earthtec Solutions LLC).
Kim, Y. et al., Remote Sensing and Control of an Irrigation System Using a Distributed Wireless Sensor Network. IEEE Transactions on Instrumentation and Measurement. 57(7):1379-87 (2008).
https://www.nrcs.usda.gov/Internet/FSE DOCUMENTS/nrcs141p2_017640.pdf (Year: 2005).

* cited by examiner

| | 1st | 2nd | 3rd | 4th | 5th | 6th | 7th | 8th | 9th | 10th | 11th | 12th | 13th | 14th | span total | overrange | systemtotal |
|---|---|---|---|---|---|---|---|---|---|---|---|---|---|---|---|---|---|
| spans Info | 185 | 185 | 185 | 185 | 185 | 185 | 185 | 0 | | | | | | | 1295 | | 1350 |
| system length manual entry | | | | | | | | | | | | | | | 0 | 55 | |
| | | | | | | | | | | | | | | | | | |
| Acres | 131.49 | | | | | | | | | | | | | | | | |
| wheel Circumference | 8132.6 | | | 1016.6 | | | 2033.15 | | | 4066.3 | | | 6099.45 | | | | |
| feet per degree | 22.59 | | 45 deg= | 1016.6 | | 90 deg= | 2033.15 | | 180 deg= | 4066.3 | | 270 deg= | 6099.45 | | | | |
| max speed/ft per min | 7 | | | | | | | | | | | | | | | | |
| GPM | 1000 | | | | | | | | | | | | | | | | |
| system uniformity | 60% | | | | | | | | | | | | | | | | |
| system efficiency | 85% | | | | | | | | | | | | | | | | |
| time for full circle | 1,161.80 | Min | | | | | | | | | | | | | | | |
| Maxtime for full circle | 19.36 | Hr | | | | | | | | | | | | | | | |
| max water per week | 2.82 | inches | | | | | | | | | | | | | | | |
| | | | | | | | | | | | | | | | | | |
| soil 1 | | | | | soil 2 | | | | | | | | soil 3 | | | | |
| root zone in inches | 8 | | | | root zone in inches | 8 | | | | | | | root zone in inches | 8 | | | |
| full point | 23% | | | | full point | 29% | | | | | | | full point | 36% | | | |
| refill | 18% | | | | refill | 23% | | | | | | | refill | 32% | | | |
| diff | 5.0% | | | | diff | 6.0% | | | | | | | diff | 4.5% | | | |
| Inches in management | 1.57 | | | | Inches in management | 1.89 | | | | | | | Inches in management | 1.41 | | | |
| gallons of water/perac | 50,215 | | | | gallons of water/perac | 51,220 | | | | | | | gallons of water/perac | 38,415 | | | |
| time to refill moisture | 110.0 | hr | | | time to refill hr | 112.3 | | | | | | | time to refill hr | 84.2 | | | |
| time to refill moisture | 4.6 | days | | | time to refill days | 4.7 | | | | | | | time to refill days | 3.5 | | | |
| percent of total circle | 48.2% | | | | percent of total circle | 17.4% | | | | | | | percent of total circle | 0.0% | | | |
| percent time to refill | 2.2 | days | | | percent time to refill | 0.8 | days | | | | | | percent time to refill | 0.0 | days | 3.0 days | |
| watering refill time | 3,181.08 | minutes | | | watering refill time | 1,170.18 | minutes | | | | | | watering refill time | - | minutes | | |
| speed set in percent | 61% | | | | | 86% | | | | | | | | 100% | | | |
| ft per minute | | | | | | | | | | | | | | | | | |
| | | | | | | | | | | | | | | | | | |
| | | | | | | | | | zone | | | | | | | | |
| | current readings | | net change | | change % | | selection | | check | | zone needed to water next | | | | | | |
| 1 | 22% | | 1.0% | | 20% | | 78% | | 0.777778 | | 3 | | | | | | |
| 2 | 26% | | 2% | | 33% | | | | 0.777778 | | | | | | | | |
| 3 | 13% | | 4% | | 78% | | | | 3 | | | | | | | | |
| | | | | | | | | | | | | | | | | | |
| current position | 2,700 | | | | | | | | | | | | | | | | |
| due north=0 degrees | 120 | degrees | | | travel | | travel | | | | | | | | | | |
| | | | soil | | distance | | distance | | time | | time | | | | | | |
| | start | stop | distance | | clockwise | | c-clockwise | | clockwise | | c-clockwise | | min | | direction | | |
| soil 1 | 2569 | 6487 | 3918 | | 8,001.60 | | 11,920 | | 19.05 | | 28.38 | | 19.05 | 1 | clockwise | | |
| soil 2 | 6487 | 7900 | 1413 | | 3,787.00 | | 13,333 | | 9.02 | | 31.74 | | 9.02 | 2 | clockwise | | |
| soil 3 | 7900 | 2569 | 2801.6 | | 5,200.00 | | 131 | | 12.38 | | 0.31 | | 0.31 | 3 | c-clockwise | | |
| | | | | | | | | | | | | | | | | | |
| walk to zone | | 3 | c-clockwise | | | | | | | | | | | | | | |
| | time needed before start | | | 0.312 | | | | | | | | | | | | | |

FIG. 18

| | | | |
|---|---|---|---|
| | | 1st | 2nd |
| spans in ft | | 185 | 185 |
| system length manual entry | | | |
| | Acres | =+((22/7)*R2*R2)/43560 | |
| | wheel Circumference | =3.14*(2*P2) | |
| | feet per degree | =+B6/360 | |
| | max speed/ft per min | 7 | |
| | GPM | 1000 | |
| | system uniformity | 0.8 | |
| | system efficency. | 0.85 | |
| | time for full circle | =+B6/B8 | Min |
| | Max time for full circle | =+B12/60 | Hr |
| | max water per week | =+(B9*24*60*7)/(27152*B5) | inches |
| | soil 1 | | |
| | root zone in inches | 8 | |
| | full point | 0.23 | |
| | refill | 0.18 | |
| | diff | =+B18-B19 | |
| | inches in management | =+B20*0.0393*B17*100 | |
| | gallons of water/per ac | =(27152*B21)/B11 | |
| | time to refill moisture | =+((B22*$B$5)/$B$9)/60 | hr |
| | time to refill moisture | =+B23/24 | days |
| | percent of total circle | =+D42/B6 | |
| | percent time to fill | =+B24*B25 | days |
| | watering refill time | =+B26*24*60 | minutes |
| | speed set in percent | =1-(B27/$B$6) | |
| | ft per minute | | |
| | | current readings | |
| 1 | | 0.22 | |
| 2 | | 0.26 | |
| 3 | | 0.125 | |
| | current position | 2700 | |
| | due north =0 degrees | =+B38/B7 | degrees |
| | | start | stop |
| | soil 1 | 2569 | 6487 |
| | soil 2 | 6487 | 7900 |
| | soil 3 | 7900 | 2569 |
| | | walk to zone | =+L33 |
| | | time needed before start | |

FIG. 19A

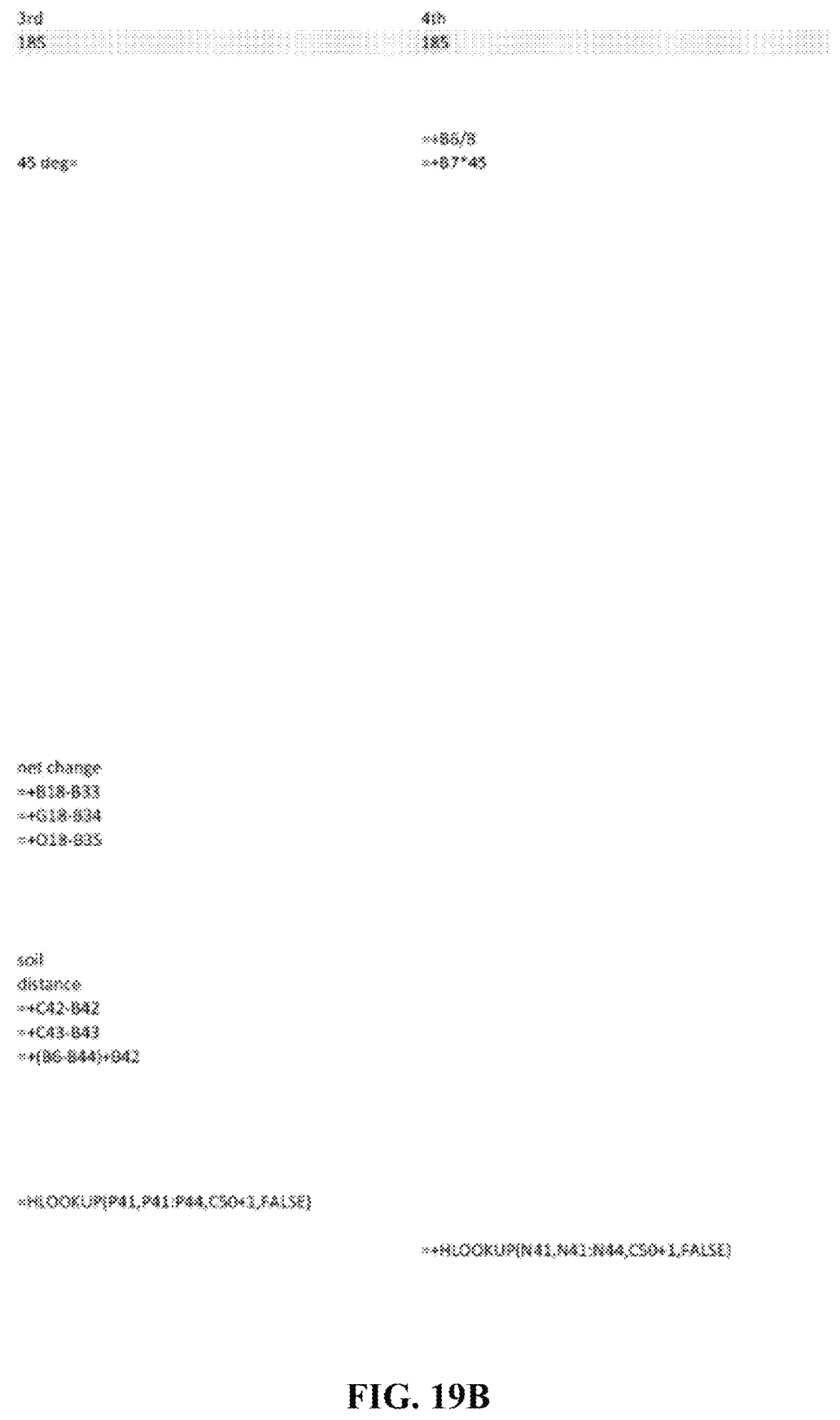

| | |
|---|---|
| 3rd | 4th |
| 185 | 185 |
| | =+B6/8 |
| 45 deg= | =+B7*45 |

net change
=+B18-B33
=+G18-B34
=+O18-B35 soil
distance
=+C42-B42
=+C43-B43
=+(B6-B44)+B42

=HLOOKUP(P41,P41:P44,C50+1,FALSE)

=+HLOOKUP(N41,N41:N44,C50+1,FALSE)

FIG. 19B

| 5th | 6th |
|---|---|
| 185 | 185 |

90 deg=

| | |
|---|---|
| soil 2 | |
| root zone in inches | 8 |
| full point | 0.28 |
| refill | 0.22 |
| diff | =+G18-G19 |
| inches in management | =+G20*0.0393*G17*100 |
| gallons of water/per ac | =27152*G21 |
| time to refill hr | =+((G22*$B$5)/$B$9)/60 |
| time to refill days | =+G23/24 |
| percent of total circle | =+D43/B6 |
| percent time to fill | =+G24*G25 |
| watering refill time | =+G26*24*60 |
| | =1-(G27/$B$6) |

change %
=+D33/B20
=+D34/G20
=+D35/O20 travel
distance
clockwise
=+IF($B$38>B42,($B$6-$B$38)+B42,B42-B38)
=+IF($B$38>B43,($B$6-$B$38)+B43,B43-B38)
=+IF($B$38>B44,($B$6-$B$38)+B44,B44-B38)

FIG. 19C

| | | | |
|---|---|---|---|
| 7th | 8th | 9th | 10th |
| 185 | 0 | | |
| =+B6/4 | | | =+B6/2 |
| =+B7*90 | | 180 deg= | =+B7*180 |

days
minutes

| | |
|---|---|
| | zone |
| selection | check |
| =MAX(F33:F35) | =IF(H33=F33,A33,H33) |
| | =IF(F34=J33,A34,J33) |
| | =IF(H33=F35,A35,J34) |

| | |
|---|---|
| travel | |
| distance | time |
| c-clockwise | clockwise |
| =+IF($B$38<C42,($B$6-$B$38)+C42,$B$38-C42) | =+F42/($B$8*60) |
| =+IF($B$38<C43,($B$6-$B$38)+C43,$B$38-C43) | =+F43/($B$8*60) |
| =+IF($B$38<C44,($B$6-$B$38)+C44,$B$38-C44) | =+F44/($B$8*60) |

FIG. 19D

| | | | |
|---|---|---|---|
| 11th | 12th | 13th | 14th |
| | | =+B6*0.75 | |
| | 270 deg= | =270*87 | |

| | |
|---|---|
| soil 3 | |
| root zone in inches | 8 |
| full point | 0.18 |
| refill | 0.115 |
| diff | =+O18-O19 |
| inches in management | =+O20*0.0393*O17*100 |
| gallons of water/per ac | =27152*O21 |
| time to refill hr | =+((O22*$D$5)/$B$9)/60 |
| time to refill days | =+O23/24 |
| percent of total circle | =+O46/B6 |
| percent time to fill | =+O24*O25 |
| watering refill time | =+O26*24*60 |
| | =1-(O27/$B$6) |

zone needed to water next
=+J35

| | | |
|---|---|---|
| time | | |
| c-clockwise | min | |
| =+H42/($B$8*60) | =MIN(J42:L42) | 1 |
| =+H43/($B$8*60) | =MIN(J43:L43) | 2 |
| =+H44/($B$8*60) | =MIN(J44:L44) | 3 |

FIG. 19E

Figure 19F:
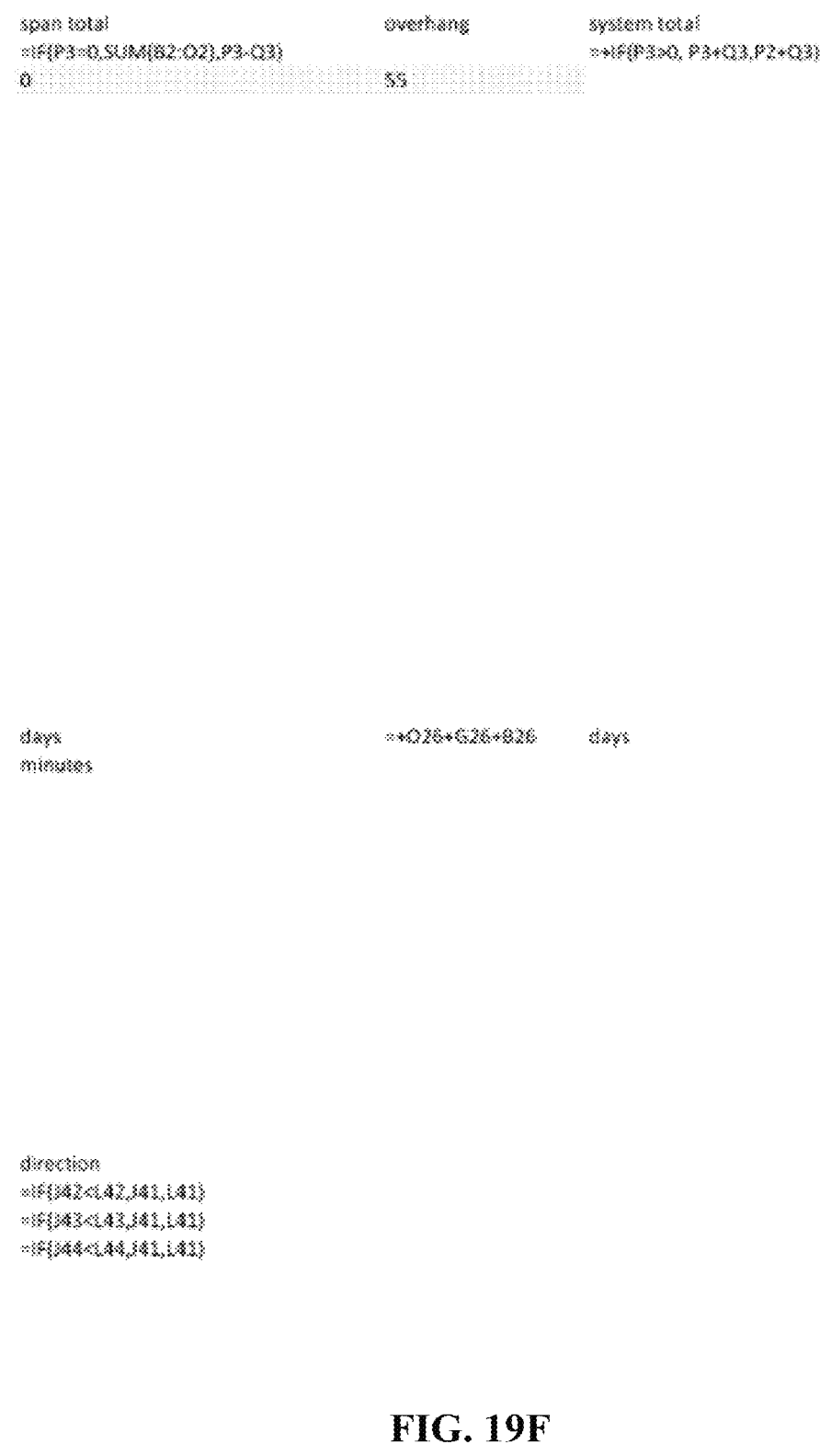

| | | |
|---|---|---|
| span total | overhang | system total |
| =IF(P3=0,SUM(B2:O2),P3-Q3) | | =+IF(P3>0, P3+Q3,P2+Q3) |
| 0 | 55 | |

| | | |
|---|---|---|
| days | =+O26+G26+B26 | days |
| minutes | | |

| |
|---|
| direction |
| =IF(J42<L42,J41,L41) |
| =IF(J43<L43,J41,L41) |
| =IF(J44<L44,J41,L41) |

FIG. 19F soil 1

| | | | | | |
|---|---|---|---|---|---|
| | | | | | days to refill |
| 19 | 23 | -0.2 | -2 | | 2.2091 |
| | 22.8 | -0.2 | -0.2000 | | |
| | 22.6 | 0 | -20 | | |
| | 22.6 | -0.4 | | | |
| | 22.2 | -0.2 | | | |
| | 22 | -0.2 | -300 | intercept time in minutes | |
| | 21.8 | -0.4 | -5 | intercept time in hr | |
| | 21.4 | 0.2 | | | |
| | 21.6 | -0.3 | | | |
| | 21.3 | -0.3 | | | 5 time needed to move and irrigate |
| | 21 | | | | |

FIG. 19G

| | | | | | |
|---|---|---|---|---|---|
| | soil 1 | | | | |
| | | | | | days to refill |
| 19 | 23 | =+B4-B3 | =SUM(C3:C14) | | =+'work sheet'!B26 |
| | 22.8 | =+B5-B4 | =+E3/10 | | |
| | 22.6 | =+B6-B5 | =+(B3-A3)/E4 | | |
| | 22.6 | =+B7-B6 | | | |
| | 22.2 | =+B8-B7 | | | |
| | 22 | =+B9-B8 | =+E5*15 | intercept time in minutes | |
| | 21.8 | =+B10-B9 | =+E8/60 | intercept time in hr | |
| | 21.4 | =+B11-B10 | | | |
| | 21.6 | =+B12-B11 | | | |
| | 21.3 | =+B13-B12 | | | =+(E9*-1)+H9 |
| | 21 | | | | |

FIG. 19H time needed to move
and irrigate

FIG. 19I

| | 1st | 2nd | 3rd | 4th | 5th | 6th | 7th | 8th | 9th | 10th | 11th | 12th | 13th | 14th | span total | overhang | system total |
|---|---|---|---|---|---|---|---|---|---|---|---|---|---|---|---|---|---|
| spans in ft | 125 | 125 | 125 | 125 | 135 | 185 | 125 | 0 | | | | | | | 1295 | | 1350 |
| system length manual entry | | | | | | | | | | | | | | | 0 | 55 | |

| | | | | | | | | | |
|---|---|---|---|---|---|---|---|---|---|
| Acres | 131.49 | | | | | | | | |
| wheel Circumference | 8132.6 | | 1016.53 | | 2033.15 | | 4066.3 | | 6099.45 |
| feet per degree | 22.59 | 45 deg= | 1016.53 | 90 deg= | 2033.15 | 180 deg= | 4066.3 | 270 deg= | 6099.45 |
| max speed/ft per min | 7 | | | | | | | | |
| GPM | 1000 | | | | | | | | |
| system uniformity | 80% | | | | | | | | |
| system efficency | 85% | | | | | | | | |
| time for full circle | 1,161.80 Min | | | | | | | | |
| Max time for full circle | 19.36 Hr | | | | | | | | |
| max water per week | 2.82 inches | | | | | | | | |

| soil number | soil 1 | | soil 2 | | soil 3 | |
|---|---|---|---|---|---|---|
| root zone in inches | 8 | root zone in inches | 8 | root zone in inches | 8 | |
| full point | 23% | full point | 28% | full point | 16% | |
| refill | 18% | refill | 22% | refill | 12% | |
| diff | 5.0% | diff | 6.9% | diff | 4.5% | |
| inches in management | 1.57 | inches in management | 1.83 | inches in management | 1.41 | |
| gallons of water/ac | 50,215 | gallons of water/ac | 51,220 | gallons of water/ac | 38,415 | |
| time to refill moisture | 110.0 hr | time to refill | 112.3 hr | time to refill | 84.2 hr | |
| time to refill moisture | 4.6 days | time to refill | 4.7 days | time to refill | 3.5 days | |
| fraction of total circle | 48.2% | fraction of total circle | 17.4% | fraction of total circle | 17.4% | |
| time to fill | 2.2 days | time to fill | 0.8 days | time to fill | 0.6 days | total time to fill 3.6 days |
| watering refill time | 3,181.05 minutes | watering refill time | 1,170.18 minutes | watering refill time | 877.63 minutes | |
| speed set in percent | 61% | | 86% | | 89% | |
| ft per minute | | | | | | |

| soil type | current readings | net change | change % | selection | zone check | zone needed to water next |
|---|---|---|---|---|---|---|
| 1 | 22% | 1.0% | 30% | 78% | 0.777778 | 3 |
| 2 | 36% | 2% | 33% | | 0.777778 | |
| 3 | 13% | 4% | 78% | | 3 | |

current position 2,700 due north =0 degrees 120 degrees

| | start | stop | soil distance | travel distance clockwise | travel distance c-clockwise | time (hr) clockwise | time (hr) c-clockwise | hours | direction |
|---|---|---|---|---|---|---|---|---|---|
| soil 1 | 2569 | 6487 | 3918 | 8,001.60 | 11,920 | 19.05 | 28.38 | 19.05 | 1 clockwise |
| soil 2 | 6487 | 7900 | 1413 | 3,787.00 | 13,335 | 9.02 | 31.74 | 9.02 | 2 clockwise |
| soil 3 | 7900 | 2569 | 2801.6 | 5,200.00 | 131 | 12.38 | 0.31 | 0.31 | 3 c-clockwise |

walk to zone 3 c-clockwise time needed before start 0.312

FIG. 20

2110

| soil type | current readings | net change | change % | selection | check | zone needed to water next |
|---|---|---|---|---|---|---|
| 1 | 22% | 1.0% | 20% | 78% | 0.777778 | 3 |
| 2 | 26% | 2% | 33% | | 0.777778 | |
| 3 | 13% | 4% | 78% | | 3 | |

2120

| | | | | | | | | | |
|---|---|---|---|---|---|---|---|---|---|
| current position | 2,700 | | | | | | | | |
| due north =0 degrees | 120 | degrees | | | | | | | |
| | start | stop | soil distance | travel distance clockwise | travel distance c-clockwise | time (hr) clockwise | time (hr) c-clockwise | hours | direction |
| soil 1 | 2569 | 6487 | 3918 | 8,001.60 | 11,920 | 19.05 | 28.38 | 19.05 | 1 clockwise |
| soil 2 | 6487 | 7900 | 1413 | 3,787.00 | 13,333 | 9.02 | 31.74 | 9.02 | 2 clockwise |
| soil 3 | 7900 | 2569 | 2801.6 | 5,200.00 | 131 | 12.38 | 0.31 | 0.31 | 3 c-clockwise |

FIG. 21

CROP-SPECIFIC AUTOMATED IRRIGATION AND NUTRIENT MANAGEMENT

CROSS-REFERENCE TO RELATED APPLICATIONS

This application is a continuation of U.S. patent application Ser. No. 18/054,662, filed on Nov. 11, 2022, which is a continuation of U.S. patent application Ser. No. 16/667,475, filed on Oct. 29, 2019, which issued as U.S. Pat. No. 11,523,571, which is a continuation of U.S. patent application Ser. No. 14/232,768, filed on Sep. 17, 2014, which issued as U.S. Pat. No. 10,512,226, which is a national stage entry of Patent Cooperation Treaty Application No. PCT/US2012/46980, filed on Jul. 16, 2012, which claims priority to U.S. Provisional Patent Application No. 61/508,215, filed on Jul. 15, 2011, each of which are incorporated by reference herein in their entireties.

BACKGROUND

Growers who farm on fields with uniform soil of the same texture class and the same crop variety can have a relatively simple approach when selecting an irrigation strategy and a fertilizer program: return enough water to satisfy the consumption of the crop (assuming your well and distribution system can deliver this in a timely manner) and provide enough fertilizer to cover plant needs for the level of production required. The total water available to the crop in the soil (e.g., field capacity minus permanent wilt point) can provide insight into how often and how much water needs to refill the volume profile in the active root zone—the depth in the soil where the roots can extract about 80% or more of the water taken up by the crop, while a simple book-keeping approach allows a straightforward fertility program. The soil texture decides if the irrigation approach is to "manage the water" (in light or medium-textured soils) or "manage the air" (in heavy soils). It should be appreciated that barring unusual weather conditions and/or catastrophic pest and/or disease outbreaks, a successful harvest can be anticipated.

SUMMARY

The disclosure generally relates to crop-specific irrigation in an environmental medium having a variety of soil types. The disclosure provides systems and methods that can permit crop-specific (or crop-controlled) automated irrigation and management of nutrients. In an aspect, a control unit can regulate operation of an irrigation apparatus according to specific water demand of a crop. Such demand can be assessed, in an aspect, by an analysis platform that can evaluate water content conditions of a medium comprising the crop, medium characteristics, and/or nutrient delivery and transport characteristics (e.g., movement of nutrients, absorption of nutrients by a plant, etc.) at the medium. Regulation of operation of the irrigation apparatus can comprise control of one or more of water supply to the apparatus, positioning and/or movement of the irrigation apparatus, or configuration of sensing devices for collection of information suitable for such regulation. The sensing devices can comprise monitoring instruments having one or more sensors that can monitor the movement of water and/or ions in the soil profile. Such sensing device can be referred to, in one aspect, as soil moisture probes and ion probes.

The disclosure provides several advantages over conventional irrigation and nutrient management technologies. As one example advantage, the disclosure assists a crop grower in maximizing production by maximizing resource utilization through implementation of a systematic methodology for agriculture—referred to herein as "precision agriculture"—that relies on collection and analysis of extensive information associated with crop development and management of farming resources. As another example advantage, the disclosure provides a grower with science-based knowledge associated with the grower's management practices that can create an environment in the soil that can optimizes the confluence of water, nutrients, air and crop roots to unlock the yield potential in every seed that is planted in his fields.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the subject specification serve to explain the principles of the methods and systems:

FIG. 18 illustrates another table (e.g., a spreadsheet) that can be generated and operated upon in accordance with one or more aspects of the subject disclosure.

FIGS. 19A-19I illustrate details of various operations that can be embedded into various cells of the table (e.g., spreadsheet) illustrated in FIG. 18.

FIG. 20 illustrates another example table (e.g., a spreadsheet) that can be generated and operated upon in accordance with one or more aspects of the subject disclosure.

FIG. 21 illustrates selected portions of the table presented in FIG. 20.

DETAILED DESCRIPTION

Figure 1:
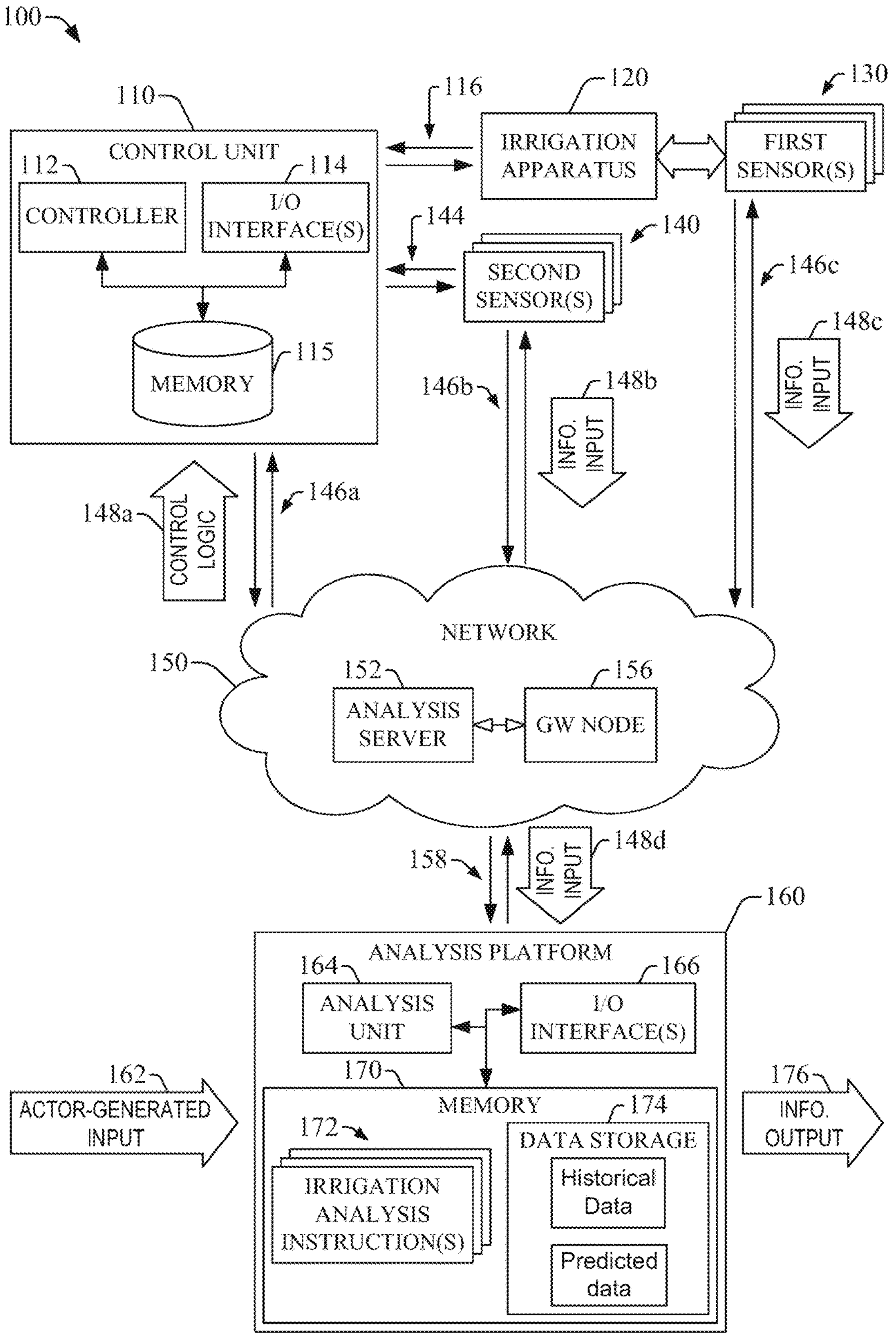
FIG. 1 illustrates an example system for crop-specific automated irrigation in accordance with one or more aspects of the disclosure.

Before embodiments of the subject disclosure are described, it is to be understood that the methods and systems are not limited to specific synthetic methods, specific components, or to particular compositions. It is also to be understood that the terminology used herein is for the purpose of describing particular, yet not exclusive, embodiments only and is not intended to be limiting.

As used in the specification, annexed drawings, and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

As utilized in the subject specification, the word "comprise," "include," and "have," and variations of such words, such as "comprising" and "comprises," "including," and "includes," and "has" and "having" mean "including but not limited to," and are not intended to exclude, for example, other features, functional elements, components, integers, or steps. In addition, "exemplary" means "an example of" and is not intended to convey an indication of a preferred or ideal embodiment. "Such as" is not used in an exhaustive, restrictive sense, but rather for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of the subject disclosure including, but not limited to, steps in disclosed methods. Thus, if there are a variety of additional steps that can be performed, it is understood that each of these additional steps can be performed with any specific embodiment or combination of embodiments of the disclosed methods.

As employed in this specification and annexed drawings, the terms "unit," "component," "interface," "system," "engine," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a unit can be an apparatus that provides specific functionality through electronic functional elements without mechanical parts, the electronic functional elements can include a processor therein to execute software or firmware that provides at least in part the functionality of the electronic functional elements. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "interface," "engine," "platform" can be utilized interchangeably.

Methods and systems disclosed herein may take the form of an entirely hardware embodiment, an entirely software embodiment, or an embodiment combining software and hardware aspects. Furthermore, such methods and systems may take the form of a computer program product on a computer-readable storage medium having computer-readable computer-executable instructions (e.g., computer software) embodied in the storage medium. More particularly, the subject methods and systems may take the form of web-implemented computer software. Any suitable computer-readable storage medium may be utilized including hard disks, CD-ROMs, optical storage devices, or magnetic storage devices.

Some embodiments of the disclosure are described herein with reference to block diagrams and flowchart illustrations of methods, systems, apparatuses, devices, and computer program products. It will be understood that each block of the block diagrams and flowchart illustrations, and combinations of blocks in the block diagrams and flowchart illustrations, respectively, can be implemented by computer-accessible (e.g., computer-readable and/or computer-executable) instructions. These computer-accessible instructions may be loaded onto a general purpose computer, special purpose computer, or other programmable data processing apparatus to produce a machine, such that the specific instructions that execute on the computer or other programmable data processing apparatus can create a means for implementing the functions specified in the flowchart block(s) and/or high-level block diagrams.

These computer-accessible instructions also can be stored in a computer-readable memory that, in response to execution by a processor, can direct a computer or other programmable data processing apparatus to function in a particular manner in accordance with one or more aspects of the disclosure. Such instructions stored in the computer-readable memory can produce, in one aspect, an article of manufacture including specific computer-accessible instructions for implementing the functionality specified in the flowchart block or blocks. The computer program instructions can be loaded onto a computer or other programmable data processing apparatus to cause a series of operational actions (or steps) to be performed on the computer or other programmable apparatus to produce a computer-implemented process such that the instructions that execute on the computer or other programmable apparatus can implement steps for providing the functionality specified in the flowchart block(s) and/or high-level block diagrams described herein.

Accordingly, blocks of the block diagrams and flowchart illustrations support combinations of means for performing the specified functions, combinations of steps for performing the specified functions and program instruction means for performing the specified functions. It will also be understood that each block (e.g., unit, interface, processor, or the like) of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The disclosure identifies and addresses, in one aspect, the issue of crop irrigation in a medium having several soil types. Multiple soil types in a field are identified by soil surveys (NRCS or USDA publications), by GPS-based soil sampling and laboratory texture analysis, or by EC-sensing coulters and the resulting geo-referenced soil maps. In many cases, variable-rate planting and/or variable-rate fertilizer applications coupled to GPS-based harvest data collection have driven the grower to a “minimize my losses” approach. Since the lighter soils in the field typically show lower yields, future plantings may have a lower population density (e.g., lower seeding rates) and lower fertilizer applications in those locations, compared to those in heavier soils in the field where production is measurably higher. This strategy is based on the premise that lower production in previous years demands lower resources in future years, because with lower expectations for yield, resources must be lowered in those portions of the field to minimize losses. Such farming strategy can largely underutilize available farming resources with the ensuing underperforming crop yield.

As described in greater detail below, the disclosure provides systems and methods that can permit crop-specific (or crop-controlled) automated irrigation and management of nutrients. In an aspect, a control unit can regulate operation of an irrigation apparatus according to specific water demand of a crop. Such demand can be assessed, in an aspect, by an analysis platform that can evaluate water content conditions of a medium comprising the crop, medium characteristics, and/or nutrient delivery and transport characteristics (e.g., movement of nutrients, absorption of nutrients by a plant, etc.) at the medium. Regulation of operation of the irrigation apparatus can comprise control of one or more of water supply to the apparatus, positioning and/or movement of the irrigation apparatus, or configuration of sensing devices for collection of information suitable for such regulation. The disclosed systems and methods for management of nutrients can permit determining quantity of nutrients and/or proper location for delivery or placement of such nutrients in the soil profile. The disclosed systems and methods rely on the use of technology and a scientific methodology for data collection that can permit identifying repeatable patterns of irrigation and nutrition management over multiple seasons.

The following terminology generally applies to the various embodiments of the disclosure:

Aerobic Soil.—Air can penetrate between soil particles to a certain depth. Soil type and density can affect the oxygen depth. If oxygen is in the soil, then such soil is considered aerobic soil. Aerobic soil generally contains micro-organisms that can provide the soil with plant-growing capabilities.

Anaerobic soil.—Soil that lies beneath the aerobic soil. In one aspect, there can be low activity in such soil zone.

Depletion Line.—Depletion Line (DL) is a reference point between field capacity (FC) and permanent wilt (PW). For example, for FC=10% and PW=2%, a depletion at 50% of the difference between FC and PW yields DL=6%.

Drainage.—When a medium (e.g., soil) is over watered, the water movement down can be considered draining. Movement below the root zone is considered leaching.

ETo.—Model that utilizes air temperature, wind speed, light intensity, relative humidity to compute what an acre of grass 1 inch high would lose in water on a per acre basis.

RETo.—Root-derived ETo.

Evaporation-Transpiration (ET).—Soil moisture can move in the soil in three ways. When water moves upwards and out of the soil, it is considered to be ET. Transpiration is water moved from the soil by a plant. Evaporation is the moisture lost off the surface of the soil.

ET Coefficient (ETc).—ETc is a diagnostic measurement that can reflect how well the plant is extracting water based on ETo. Based on ETo, the ETc can indicate over watering or under watering in a medium having an associated soil type.

Grow Days.—The number of days from planting to end of harvest. If multiple harvest, then end of harvest refers to the end of the last harvest.

Nutrient Efficiency.—A measurement of the nutrient management reflecting maximum output for minimum input. Generally conveyed in “units per pound.”

Optimum Allowance.—By monitoring root activity, a profile of water uptake can be determined. As the soil moisture decreases, the plants ability to extract moisture is reduced. By measuring the uptake, it is possible to determine when the plant is in stress taking up water. Optimum allowance allows computation of how wide a swing in soil moisture is possible before a plant starts to struggle for water.

Optimum Soil Ratio Water/Air.—By monitoring root activity and adding water uptake every 15 minutes, it can be determined when the optimum soil ratio between water and air is achieved. This becomes the baseline to manage irrigation. Generally, optimum soil ratio water/air coupled with optimum allowance forms a window of management.

Soil Texture.—Soil texture can determine, to a large extent, field capacity and permanent wilt, e.g., instance whereby a plant can no longer extract water from the soil to maintain life. Soil texture can be measured, for example, in terms of respective percentages of three particle sizes: (1) percentage of sand, which has the largest particle size; (2) percentage of silt, which has the second largest size; and (3) percentage of clay, which has the smallest particle size.

Root Activity.—Feeder roots are designed to take up water and nutrients. Feeder roots must move forward or they perish. Feeder roots only develop and move through moist soil. Feeder roots are the most effective in aerobic soils. Nearly 80% activity of all feeder root activity can be within the top 8 inches of soil. Root development generally is random. Roots cannot find water and grow to the water. In response to detecting water, a plant develops more feeder roots in the area in which water was detected. Root activity mostly occurs during daylight.

Stress Day.—A stress day is a day in which the water uptake does not closely reflect ETo. If a plant is not in the window of optimum root activity, this is considered stress.

Total irrigation.—Amount of water applied to the crop. Measured in inches it is based on an acre. In an aspect, there are 27,154 gallons of water in an acre inch.

Water/Soil Ratio.—In order to manage plants at a high level, understanding of where the plant is extracting water within the soil profile can be essential. The disclosure establishes, in one aspect, ratios conveying the total availability of water in 4" increments to illustrate the amount of water extracted, and showing the correlation between available water and uptake from the plant. This is one of the essential components necessary for management of water and nutrient uptake. This is referred to as the management zone.

Water Efficiency.—Most any plant transpires water in order to move nutrients and chemicals throughout the plant. The amount of water retained for plant and fruit production can be measured as water efficiency. The higher the percent, the better the water efficiency. Water efficiency is thus a measure of how optimally water is used.

FIG. 1 illustrates a high-level block diagram of an example system 100 for crop-specific automated irrigation in accordance with one or more aspects of the disclosure. As illustrated, the example system 100 comprise a control unit 110 functionally coupled to an irrigation apparatus 120 via communication links 116 (wireless links, wired links, or a combination thereof). The control unit 110 can configure operation of the irrigation apparatus 120 and thus can control irrigation of a field having one or more soil types. In one aspect, the control unit 110 can configure one or more of a delivery rate of water or a delivery rate of other resource(s), such as a fertilizer or other nutrients. In an embodiment in which the irrigation apparatus 120 is a movable irrigation apparatus, the control unit 110 can configure movement of the irrigation apparatus. For example, the control unit 110 can configure direction of movement, speed of movement, or the like.

The irrigation apparatus 120 can comprise or can embody a center pivot or a single drip irrigation block. In one aspect, the irrigation apparatus 120 can operate electrically or hydraulically. The approach to management under these conditions is easily accomplished by using soil moisture probes and ion probes. The irrigation apparatus 120 can be functionally coupled (e.g., communicatively coupled, or mechanically coupled, or both) to a set of one or more sensors 130, which can comprise one or more of a camera or other optical sensor, a global navigation satellite system (GNSS) unit, such as a Global Positioning System (GPS) unit, or the like. In one aspect, each of the one or more sensors 130 can communicate with the control unit 110 either wirelessly or via a wireline connection.

The control unit 110 can communicate with at least one of the one or more sensors 130. Communication with such sensor(s) can be accomplished, at least in part, via the communication links 116. In addition or in the alternative, the control unit 110 also can communicate with a set of one or more second sensors 140. In one implementation, at least one of such sensors (e.g., one sensor, two sensors, more than two sensors, etc.) can be deployed in the field. In one aspect, a sensor of the one or more second sensors 140 can embody or can comprise one or more vertical arrays of soil moisture content instrument(s) and/or ion content instrument(s). In an addition or in the alternative, a sensor of the one or more second sensors 140 can embody or can comprise a meteorology instrument, such as temperature and humidity measurement instrument, a wind speed measurement instrument, a solar radiation measurement instrument, a soil temperature measurement instrument, a rainfall data collection instrument, or any combination thereof.

In response to communication with a sensor of the one or more sensors 130 and/or a sensor of the one or more sensors 140, the control unit 110 can exchange (e.g., transmit, receive, transmit and receive, etc.) information (e.g., data, metadata, or signaling, or a combination thereof) associated with environment conditions of an environmental medium (e.g., soil, air, water, or a combination thereof). As illustrated, the control unit 110 can comprise one or more input/output interfaces 114 that can permit receiving or transmitting information (e.g., data, metadata, signaling) in several formats, one or more of which can be specific to the a sensor of the one or more sensors 140, or a sensor of the one or more sensors 130.

As illustrated, the control unit 110 can communicate with an analysis platform 160. In one aspect, the control unit 110 can exchange (e.g., transmit and/or receive) information, such as data, metadata, code instructions, signaling, a combination thereof, or the like, with an analysis platform 160. In one embodiment, the control 110 can communicate with the analysis platform 160 via a network 150, which is coupled to the control 110 via communication links 146*a* and to the analysis platform 160 via communication links 158. In one aspect, one of the I/O interfaces of the one or more I/O interfaces 114 can permit coupling the control unit 110 to the communication links 146*a*, which at least in part can couple the control unit 110 to a gateway node 156 within the network 150.

The analysis platform 160 can comprise with software embodied in computer-executable instructions retained in one or more memory elements 172, referred to as irrigation analysis instruction(s) 172. Such software can be executed by one or more processors (not shown; see also FIG. 10) which can be part of the analysis unit 164. In addition or in the alternative, the analysis unit 164 can execute such instructions. The analysis unit 164 is functionally coupled to data storage 174, which contains historical environmental data, which is referred to as historical data. In one aspect, the historical data can in the data storage 174 can be processed according to the irrigation analysis instruction(s) 172 and can permit generating predictive data based on artificial intelligence generated from analysis performed in accordance with the various aspects described in Patent Cooperation Treaty Application No. PCT/US2011/30739, filed on Mar. 31, 2011, which is incorporated herein in its entirety. As illustrated, the analysis platform 160 can remotely (e.g., via telemetry) receive information associated with environmental data through the network 150. and electronic inputs from data collectors/measuring instruments. In one aspect, the info. input 148*d* can be referred to as electronic inputs and can include soil moisture measurements and/or ion content measurements, pivot position/movement direction and speed (which can be accessed via GPS coordinates), weather data (such as air temperature and humidity, wind speed, solar radiation, soil temperature) and calculations (ETo, Heat Units, etc.), crop canopy light reflectance (as acquired, for example, by optical sensors). Such information can include at least a portion of information (info.) input 148*b* and information input 148*c*, which can be generated by at least one sensor of the one or more sensors 140 and at least one of the first sensors 130. In addition, as part of the analysis for automated irrigation described herein, the analysis platform 160 can receive information from an end-user device, such information can be associated with crop growth stage, adjustments to irrigation set points, etc., and is referred to as actor-generated input 162.

The analysis unit 164, in response to execution of the irrigation analysis instruction(s) 172 can perform various of the methods described herein (see, e.g., flowcharts in FIGS. 11-17). In one aspect, the analysis component 164 can utilize at least a portion of the data available in the data storage 174 (e.g., a database) and can generate control logic that can permit configuration of crop-specific automated irrigation in accordance with aspects described herein. The analysis platform 160 can transmit the control logic as computer-executable instructions that a controller 112 (e.g., a programmable logic controller) contained in the control unit 110 can execute in order to cause the irrigation apparatus 120 to automatically irrigate a filed comprising a plurality of zones in accordance with various aspects described herein. The control logic is represented as control logic 148*a* in FIG. 1.

It should be appreciated that the information in data storage 174, and utilization thereof, is a unique feature of the disclosure. In one aspect, such data storage can be a database that operate as a repository of all raw and transformed electronic and actor-generated input (e.g., human-generated input) collected by the analysis platform 160. Availability of the data storage 174 can permit to compare historical results associated with a specific irrigation field, as well as other fields that have a similar crop, or variety, or field texture. We can understand if there are correlations that exist between the previously-collected data and use it for the current data, or if not, how this unique current situation should be handled. By capturing data on crops, we can immediately know the rooting zone of the crop at the current growth stage in the current soil type is similar to that which has been determined previously. It will also allow us to extend the use of crop varieties to different soil types and climates by collecting data on newly-developed crop varieties (through contract research with seed companies) as various new (e.g., different than those already in the data base) soil types are planted with this variety. We can also predict the final yield of the variety based on previously-collected yield data collected from fields with similar soil texture to calculate an NDVI for use in fertilizer applications. Thus, this software integrates the data collected to indicate where, when and how much water and nitrogen should be delivered to the crop, via a downloadable file that is read by the controller. The controller uses the information until changes in the incoming data to the software results in new settings for the controller which overwrites the downloadable file with new instructions. This feature ensures that the pivot continues to operate under circumstances when the telemetry is not functional. The inputs to the software include (but are not limited to) the following information regarding the crop such as the grower's target yield, the crop, the crop variety, the soil type(s) in the field, the pre-plant soil fertility test results, the planting/transplanting date, latitude and longitude coordinates, the soil moisture deficit level and the NDVI (from the data base), digitized maps of the soil types in the field, the GPM delivered by the pivot, the length of the total span of the pivot and the area irrigated by the pivot.

System Requirements

The following items set the limits of the system (ie, whether the described control system can be used on systems with defined characteristics).

Span width: defines the area that is irrigated (it is the radius of the circle that can be irrigated). It is the distance from the pivot center to the end of the last span (not including the overhang)

Last wheel track defines the circumference of the circle that the last span covers The overhang includes the area outside the span width (the area reached by the nozzles and gun at the end of the control tower). The area of the overhang plus the area of the span width equals the total area irrigated.

The speed of the control tower is the linear feet covered per unit time of the outermost wheels of the pivot. Knowing the linear feet covered per unit time and the circumference of the pivot circle, one can calculate the time needed to achieve a complete transit of the irrigated surface.

GPM is gallons per minute delivered by the pivot.

The crop defines the expected demand for water from the irrigation system.

The soil type(s) define the water holding capacity of the surfaces, and the distribution of these types define the segmented zones with specific requirements for water.

Configuration of the Control System

In order to configure the example systems described herein (e.g., example system 100), parameters can be defined, such as, the soil types in the field, their location, and/or compute the area of each soil type.

The distance from the pivot supply pipe to the control tower can be measured to obtain the radius of the pivot.

Using the allowable deficit and the measured field capacity of each soil type, the full points and refill (trigger) points of each soil area can be defined. This determines when the irrigations starts and for how long they run, and allows one to calculate when an irrigation is needed in each zone.

Using the circumference scribed by the wheels of the last span, the distance (in linear feet) where each zone begins and ends can be determined. See the example on the next slide.

Figure 2:
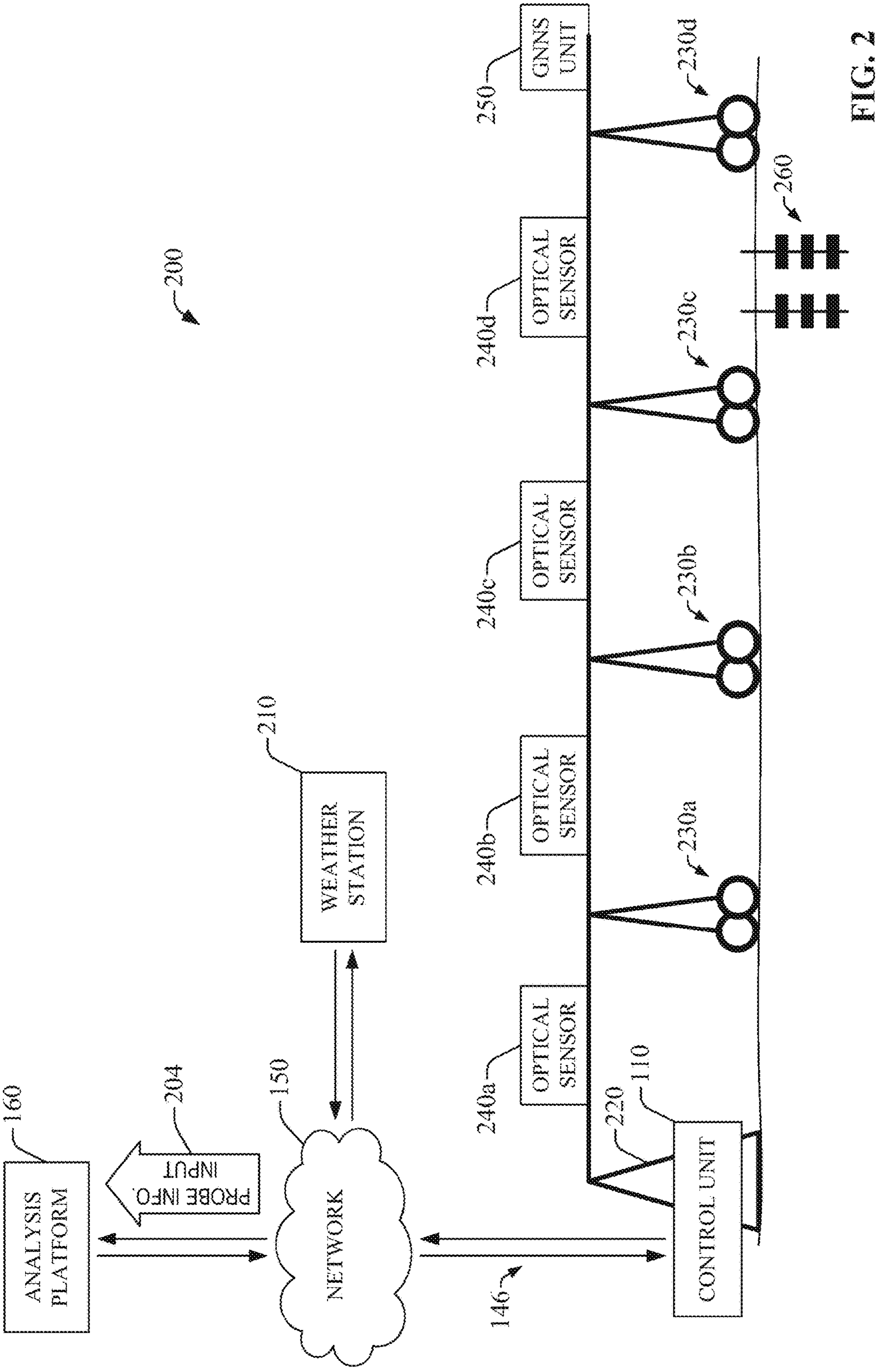
FIG. 2 illustrates a high-level block diagram of an example irrigation system for crop-specific automated irrigation in accordance with one or more aspects of the disclosure.

FIG. 2 illustrates a high-level block diagram of an example irrigation system 200 for crop-specific automated irrigation in accordance with one or more aspects of the disclosure. As described herein, the irrigation apparatus 120 can be embodied in a center pivot irrigation system 210 (also referred to as center pivot 210). The center pivot 210 can be controlled by the control unit 110 in accordance with one or more aspects described herein, which can configure one or more of a the delivery rate of water or other resource, the direction of movement the center pivot (e.g., forward or clockwise rotation, or reverse or counterclockwise rotation) and other operation variables. The center pivot 210 also has a GNNS position sensor (referred to as GNNS unit 250) located on the outermost span of the pivot. As illustrated, the example irrigation system 200 comprise the center pivot irrigation system 210, having from one to multiple (e.g., four) spans separated by tractor wheels 230*a-d*, upon which are located orifices or nozzles that deliver water, and additional water-soluble or suspended chemicals, nutrients/fertilizers, and other inputs, to the crop. The control unit 110 can communicate with remote components, located on the pivot (optical sensors, GPS unit), in the field (vertical arrays of soil moisture and ion content instruments 260; air temperature and humidity, wind speed, solar radiation, soil temperature, rainfall data collection instruments, embodied in weather station 210) by hardwire connections and/or telemetry (e.g., wireless communication via network 150, as described herein.

As described herein, the center pivot irrigation system 210 also has a GNNS position sensor (250) located on the outermost span of the pivot, which can communicate with the pivot controller 210 (either through telemetry or hardwire connection, for example) to provide an approximation of the location of the pivot with respect to the circumference of the circle which the wheels of the outermost span of the center pivot traverse.

On the pivot spans (segments represented with thick lines and demarcated by tractor wheels 230*a-d* can comprise optical sensors 240*a*-240*d* (or any other sensor or probe) that can measure reflected light from the crop canopy as they traverse the field, and translate the reflectance readings into nitrogen application rates using a NDVI (nitrogen derived agronomic index).

Figure 3:
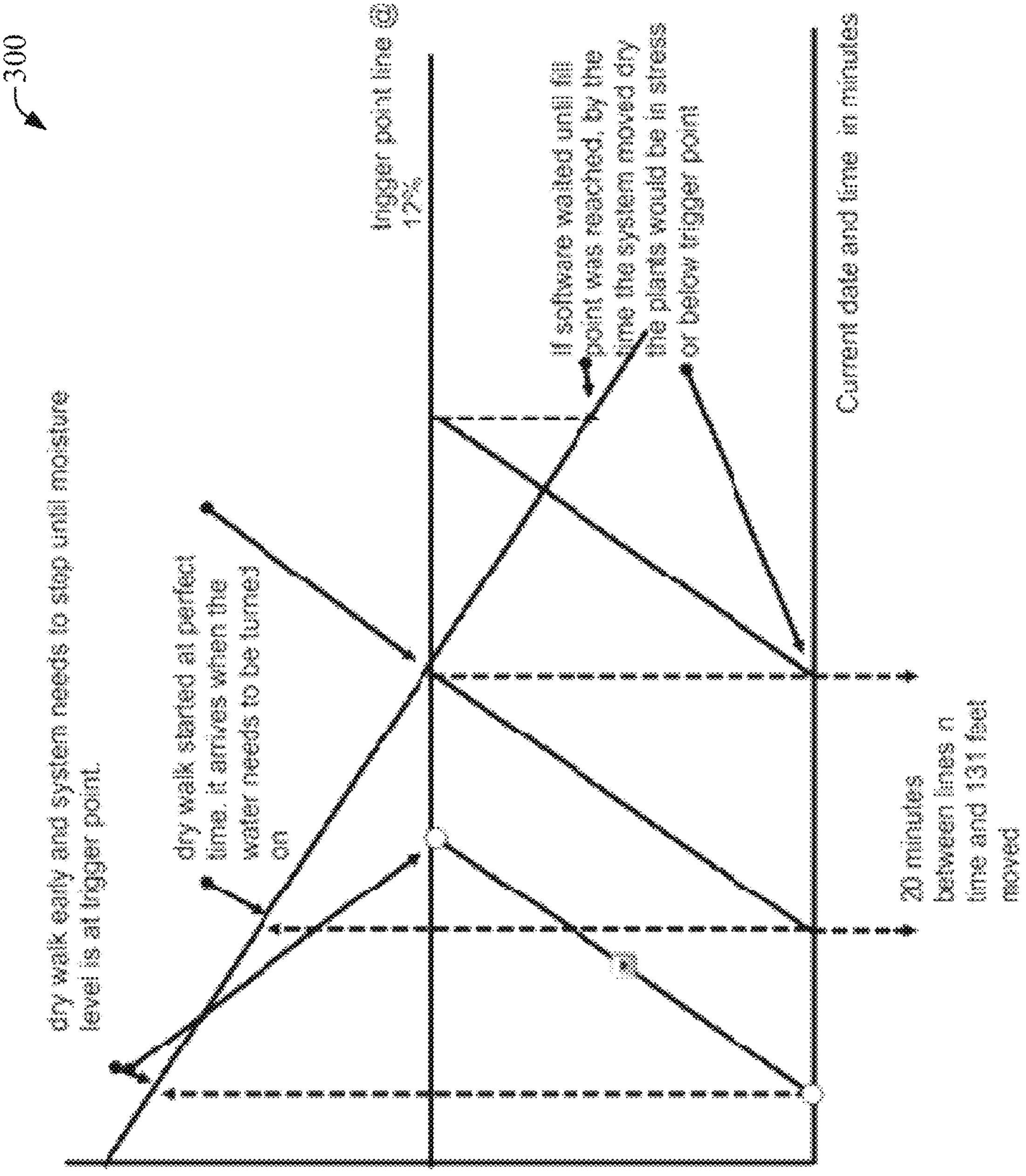
FIG. 3 illustrates moisture content in an environmental medium as function of time in accordance with one or more aspects of the disclosure.

FIG. 3 presents a diagram 300 that illustrates moisture content (expressed in percentage) in an environmental medium as function of time in accordance with one or more aspects of the disclosure. In one embodiment, the environmental medium can comprise at least one soil type. In particular, the diagram 300 presents net moisture (or water) content, which decreases as time increases, and a moisture trigger point which remains nearly constant as time increases. In scheduling irrigation by center pivot, the pivot must be able to provide water when the crop demands it (e.g., in this figure, before the soil water content decreases to the trigger point, which is the deficit value allowed for the crop (beyond which water stress will limit the achievable yield). This point can be calculated by predicting the time through regression analysis. The pivot can be repositioned to deliver the required water by calculating by a series of calculations that are described herein.

In one aspect, determine if automation is possible and how to make the decision on when to move the pivot. First, the set point of each soil type is determined. This is referred to as the trigger point shown in the graft as a straight line across the graph. Next the soil that needs watering next is determined. That set point is the line drawn in the graph of that soil type. By determining where the center pivot is sitting a calculation is need to determine which direction is the closest way to travel to the soil block that now needs watering. Once the direction is determined, the time needed to move the system is calculated. That time is then plotted against the drawdown of water moisture in the soil profile. The draw down is represented on the graph as the line that is declining over time on the X axis. By calculating the intercept, the system can be moved at the right moment, then as soon as it arrives at the starting point water is turned on and the system starts applying water to refill the soil profile. Without this process waiting for the trigger point to be reach would cause the soil to dry down below the accepted level because the time to move the pivot into position was not calculated in. The calculations can be performed by the analysis unit 164 in response to execution of the irrigation analysis instruction(s) 172. Results associated with such computation can be retained in data storage 174.

Figure 4:
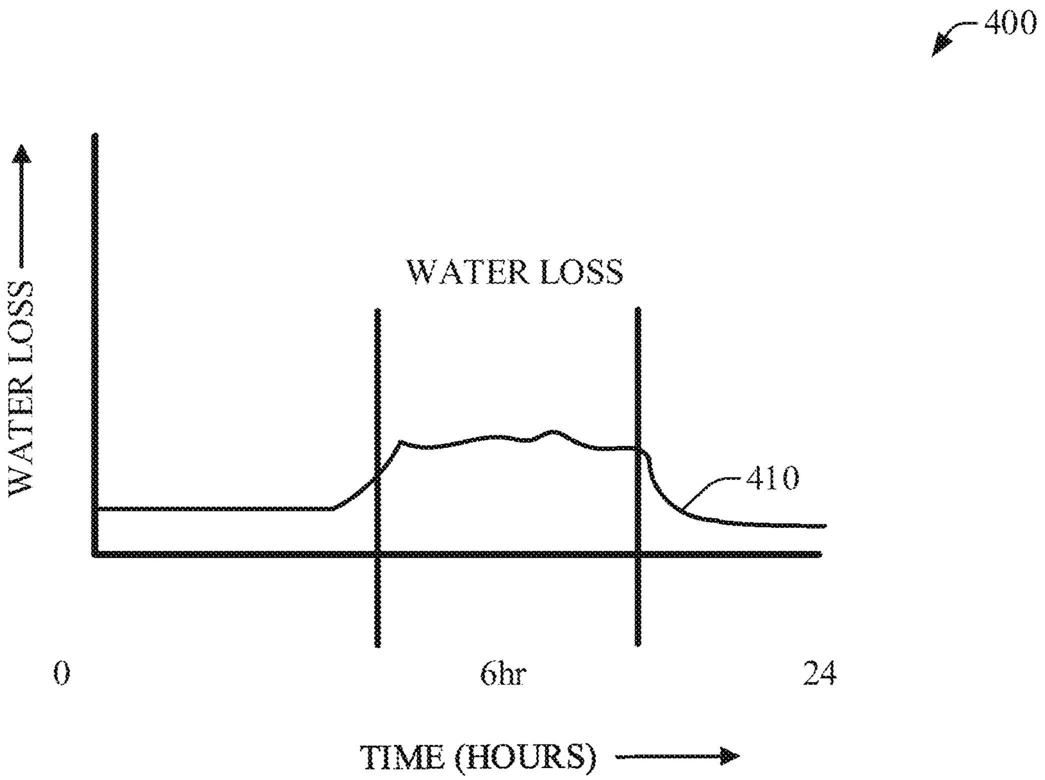
FIG. 4 illustrates water loss in from an environmental medium a 24-hour period in accordance with one or more aspects of the disclosure.

FIG. 4 presents a diagram 400 that illustrates water loss (represented in a chart 410) in from an environmental medium a 24-hour period in accordance with one or more aspects of the disclosure. In one embodiment, the environmental medium can comprise at least one soil type. We can use RETo also referred to as ($TX_{RETo}$) to determine when water loss from the soil switches from "plant uptake+ normalization" to "normalization only", signaling when the withdrawal of water from the soil profile by the roots is essentially no longer possible. This can be indicated by a reduction in the absolute value of negative deltas ($8=-|\Delta|$) to small numbers ($|\Delta|<0.05$); values above that number can be summed and the water extracted from the soil profile can be calculated and the resulting decrease in available water in the profile can be estimated. Deltas refer to differences between time-dependent measurements of environmental quantities. Available water for a soil type can be calculated based on a database contained within our AdviroGuard™ software, based on the water-holding capacities of the soil type. An estimate of when the water content of the soil will reach the trigger point can be made, signaling when the pivot needs to be in place to deliver water. A second way to predict the triggering time would be to determine how much water is extracted per unit of the calculated ETo. This can also estimate when the trigger point will be reached by summing daily ETo values and extrapolating to when the trigger point will be reached.

Figure 5:
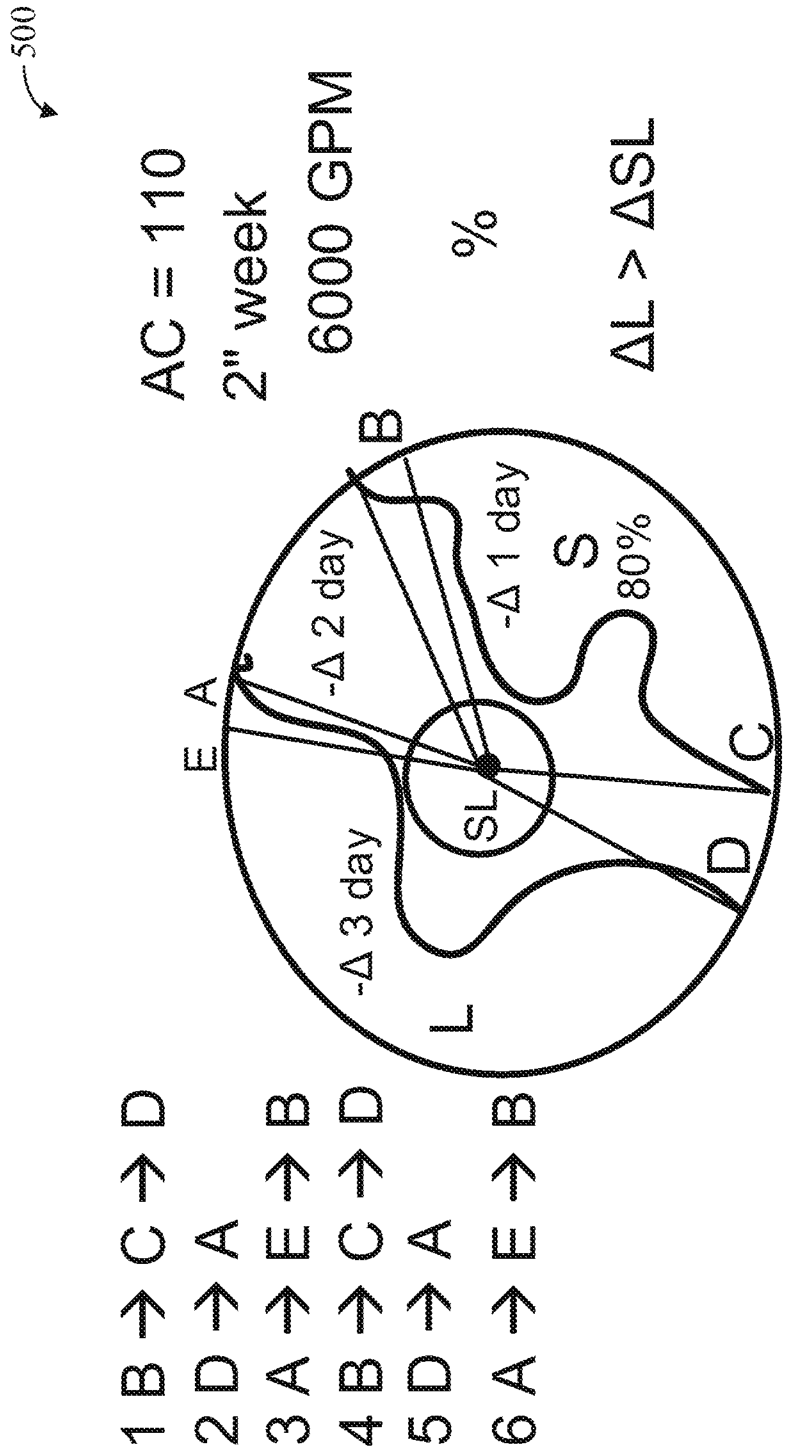
FIGS. 5-6 illustrate a plurality of zones in an irrigation field in accordance with one or more aspects of the disclosure.

FIG. 5 presents a diagram 500 that illustrates an example soil field having three soil types distributed within the span width of a center pivot in accordance with one or more aspects of the disclosure. This depiction of a center pivot (see, e.g., center pivot 210) and possible soil types within the center pivot growing area serves as an illustration of a particular situation and how the methods and systems provided can determine when and where a pivot must be located to deliver water to the crop. This picture represents a 110 acre field that is irrigated via a center pivot. The field has three soil types within it, with sandy soil (S) on the right side of the field, loam soil (L) on the left side of the circle, and a strip of sandy loam soil (SL) in the center. Each of the soil types has a different soil water holding capacity (the loam soil has a higher water holding capacity than the sandy loam, and the sandy loam soil has a higher water holding capacity than the sandy soil). These differing soil types means that the sandy soil needs to be watered every day, the sandy loam soil needs to be watered every two days, and the loam soil needs to be watered every three days. Around the circumference of the circle are points (A through E) which define the field into segments that contain roughly a majority of one soil type, so scheduling the irrigations can be accomplished by moving the pivot over 6 days in the pattern indicated by the day (the lines of text that are listed from 1 to 6). At the starting point, the pivot is parked at point B on the circumference, and over the course of a day, moves from B to C while irrigating. The water is then turned off, and the pivot is moved to point D. On day 2, the water is turned on, and the pivot moves towards from point D to point E (which is also designated as point E). On day three, the pivot irrigates the entire field by moving from point A to point E, and then moves without irrigating to point B. The pattern then repeats itself, so that each segment is watered according to its need to have its soil profile "refilled" each time the 3-day pattern is repeated.

It should be appreciated that the radial nature of the center pivot and the irregular distribution of the soil types can result in a partitioning of the irrigation field into a plurality of zones that are circular sectors or "circular wedges", such as the sector defined by the origin (at the center of the circle) and the vertices B and C. Similarly other circular wedges are defined in other zones associated with other soil types in the irrigation field illustrated in FIG. 5.

Figure 6:
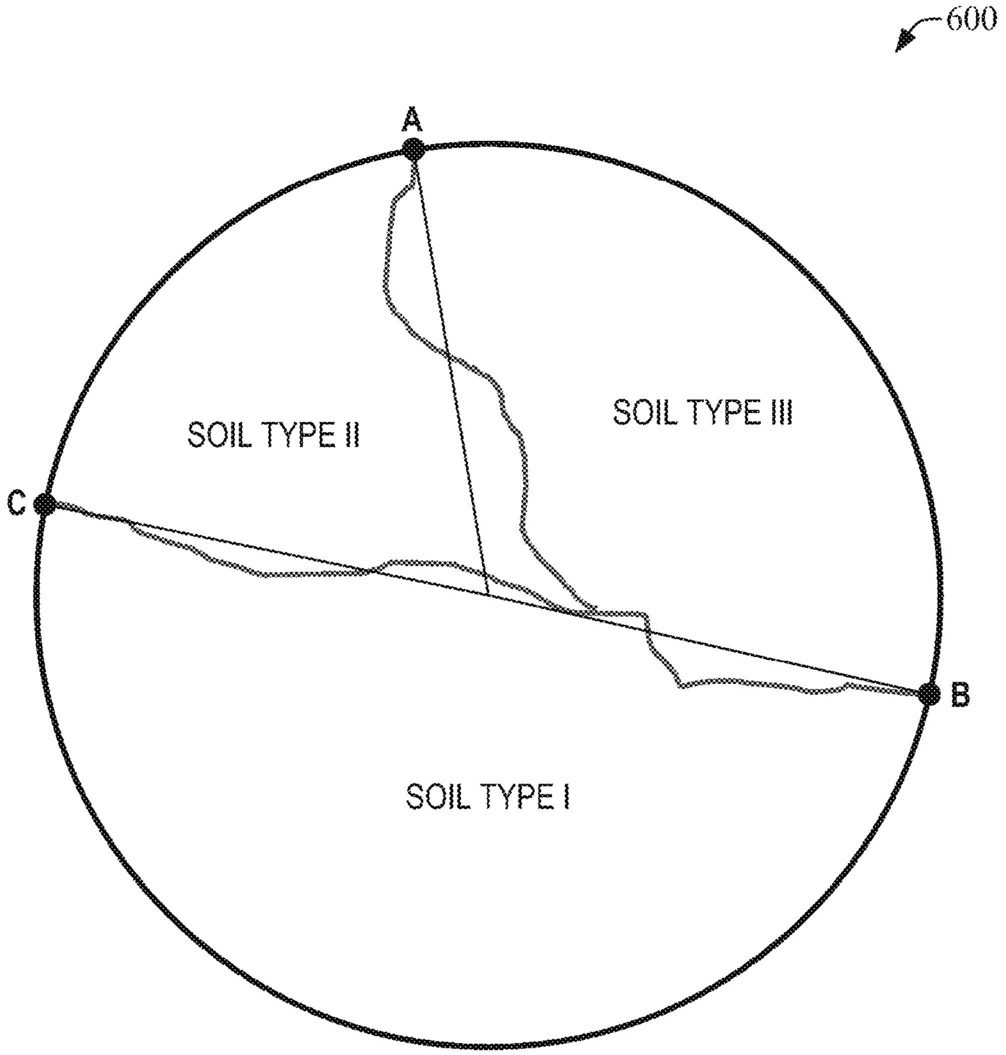

FIG. 6 presents a diagrams 600 that illustrates another example soil field having three soil types distributed within the span width of a center pivot in accordance with one or more aspects of the disclosure. As illustrated, three circular wedges can be generated for the illustrated arrangement of soil types I, II, and III. Using the information on the preceding slide, one can determine where irrigations start and stop In this example, the total circumference of the circle is 8132 ft. The zone defining soil type I is from 2569 feet to 6487 feet; the zone for soil II is from 6847 feet to 7900 feet, and the zone for soil III is from 7900 feet to 0 feet, plus 0 feet to 2569 feet. One now knows the linear distance that one needs to move, and from which point to which point, in order to irrigate that zone.

Calculation of Suitable Irrigation Zone

As described herein, to calculate which zone is to be irrigated next, the following calculations can be performed:

Subtract the trigger soil moisture percentage from the full (field capacity) soil moisture percentage for each soil.

Determine the current % soil moisture reading in the active root zone, using RETo to determine which depths in the soil constitute where root uptake is occurring and then using a capacitance soil moisture probe to measure the water content at each depth, and subtract it from the full point in each zone to get the net change in each zone. Divide the net change into the difference between the full and trigger point, and then compare that figure from each zone. The largest ratio of (full-trigger)/net change is the first zone to irrigate, since this needs the most percentage of water to be added.

As described herein, the analysis unit 164 or a processor functionally coupled thereto can perform such calculations.

Computation of Travel Time to the Suitable Irrigation Zone

In order to compute Determine where the pivot is now, in feet (around the circumference, as previously depicted in slide 4). Since you know where the start and stop points are for each zone, determine the distance to reach the start point of the next zone to be irrigated in a clockwise direction (A→B→C→D) and in the counterclockwise direction (A→D→C→B). Calculate the minutes needed to reach all the zones in each direction, and select the minimum distance to reach the next zone.

Using RETo (also referred to as $TX_{RETo}$), one can compute how much water needs to be replaced, as well as when the profile reaches the trigger point. Since water loss from the profile is not linear but a curve function with a rise, plateau and fall, having the same general shape as ETo over time, and usually occupies a duration of 6-10 hours each day, centered around 12 noon through 1 pm (see, for example, the diagram of water loss as a function of time in FIG. 4). The time stamps of soil moisture readings and deltas used to compute RETo can permit extrapolate to the time when the soil moisture level reaches the trigger point in each pivot zone, and the movement of the pivot to the correct location on the circumference of the pivot must be complete before the time the soil moisture reaches the trigger point. This can be confirmed by subtracting the travel time from the start time for the irrigation of the zone to indicate the time that the movement of the pivot to the start location must begin.

As described herein, the analysis unit 164 or a processor functionally coupled thereto can perform such calculations.

FIGS. 18 and 20 present an example tables (e.g., spreadsheets) that the analysis unit 164 can implement and utilize to calculate the refill times and irrigation schedule for a pivot consisting of three distinct soil types is attached to highlight the calculations made by the software (e.g., instruction(s) 172) in accordance with one or more aspects of the disclosure. FIGS. 19A-19I illustrate details of various operations that can be embedded into various cells of the table (e.g., spreadsheet) illustrated in FIG. 18. Substantially the same operations are implemented in the table (e.g., spreadsheet) in FIG. 20. The nomenclature utilized to represent operations applied by the analysis unit 164 in response to the software is the one utilized by Microsoft Excel language. The spreadsheet illustrated in FIG. 20 is described in detail herein. FIG. 21 is a detail of FIG. 20 that presents a block 2110 conveying information related to water requirements and specific values of moisture content that permit establishing the next zone to be irrigated ("zone 3" in panel 2110). Panel 2120 presents topographical information (e.g., distances) associated with movement of the center pivot for the three zones illustrated in FIG. 6. Intercept times ("time (hr)") for clockwise and counter-clockwise movement also is presented. Travel distance in forward and reverse also are presented for the field represented in FIG. 6. Order of movement for the center pivot also is presented in panel 2120 starting in a cell labeled "direction". References to rows are made throughout this description, rows are horizontal lines that indexed with an integer starting with value of "1" in increasing one unit per line. In such description, reference is made to the "map" or soil topography in FIG. 6. In such drawing, that the center pivot is not drawn to scale, except for the outermost wheel track of the pivot. The red lines represent the boundaries of the different soil types (identified as Soil I, Soil II and Soil III on the map and on the worksheet) and the intersections of the boundaries with the circumference of the wheel track of the last pivot are also shown in degrees (the reference point of 0/360 degrees is located at the uppermost point of the circumference) on the worksheet.

On the worksheet itself are located shadow-colored cells that represent locations where data pertaining to the pivot span, the pivot overhang, the maximum pivot speed (the linear distance of the outermost wheels per unit time), and crop and soil factors relating to soil moisture and the depth of the active root zone can be entered, either by human intervention or by electronic means. Entering data about the pivot yields the acreage irrigated by the pivot, the circumference of the circle scribed by the outer wheel track of the pivot and the number of linear feet traversed by the pivot per degree of movement. The time to traverse a full circumference by the pivot can be computed, as well as the amount of water (in acre-inches) delivered to the entire surface of the circle.

The section of the worksheet from row 16 to row 29 computes the water needed for each of the three soil types within the pivot, as an example of the use of the worksheet. In theory, more or fewer soil types can be present and the calculations made. Each soil type is characterized by inputs pertaining to the depth of the active root zone of the crop, the maximum percentage water allowed in the active root zone and the minimum percentage of water permitted in the active root zone (before an irrigation is signaled). The amount of water (in acre-inches and in gallons) needed to refill each soil type is then calculated, followed by the amount of time needed to deliver the water, as well as the percentage of maximum speed the pivot must run to deliver the proscribed amount of water.

The selection of which soil type needs to be irrigated first is computed in rows 32 to 36, and is based on the current volumetric percentage of water in the active root zone. These measurements are made by the soil moisture probes and ion probes, and this data can be entered electronically or manually. The soil type needing the largest % refilled is selected as the first soil type to be irrigated (in this example, soil type 3). The pivot arm must then move to one of the boundaries of soil type 3 (from its current position (electronically or manually entered, at 2700 feet, to either boundary of 7900 feet in a clockwise direction or 2569 feet in a counter-clockwise direction). The worksheet then calculates the time needed for movement to the closest boundary and delivers instructions to the pivot controller to "walk dry counter-clockwise to the boundary at 2569 feet (with an elapsed time of about 0.3 hour at maximum speed). The center pivot can then begin irrigating soil zone III with the prescribed amount of water, and then repeat the calculation of water needed. Since zone III should show the water content of the soil near to the full point, this zone will have the lowest priority for an immediate irrigation, while soil zones I or II may be closer to the minimum water content that signals the next irrigation.

Figure 8:
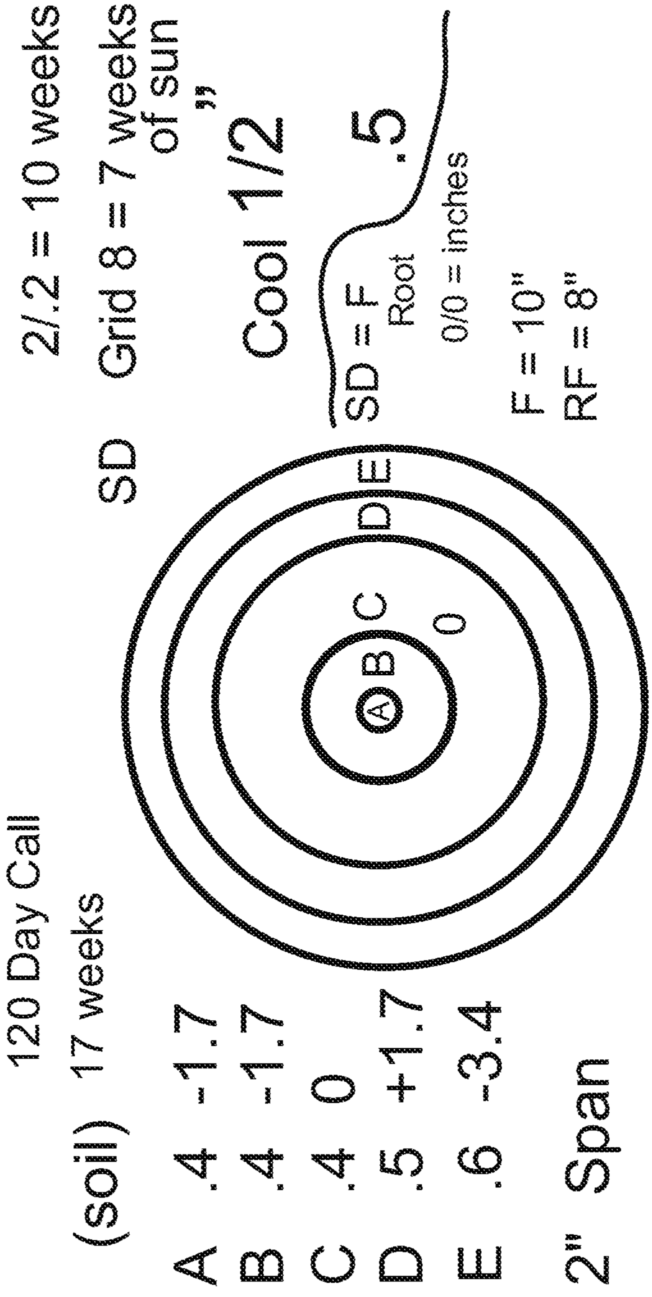
FIG. 8 present a diagram 700 that illustrates a soil field being irrigated with a center pivot in accordance with one or more aspects of the disclosure. As illustrated, in one aspect, the center-pivot comprises four spans (see, e.g., FIG. 2).

FIG. 8 presents a diagram 700 that illustrates a soil field being irrigated with a center pivot in accordance with one or more aspects of the disclosure. As illustrated, in one aspect, the center-pivot comprises four spans (see, e.g., FIG. 2). The uniformity of the output of water from the pivot needs to be measured in order to determine if the grower will benefit from implementing this pivot control scheme, since non-uniformity introduces potential stress conditions on the crop being watered (an incidence of over-watering as well as under-watering lead to stress on the crop). Understanding the influence of stress days on crop yield and the price of the crop can determine how a given measure of non-uniformity influences the financial benefit from growing the crop, and can provide the grower an indication of whether or not retrofitting the grower's center pivot with more appropriate nozzles is warranted or not.

Figure 9:
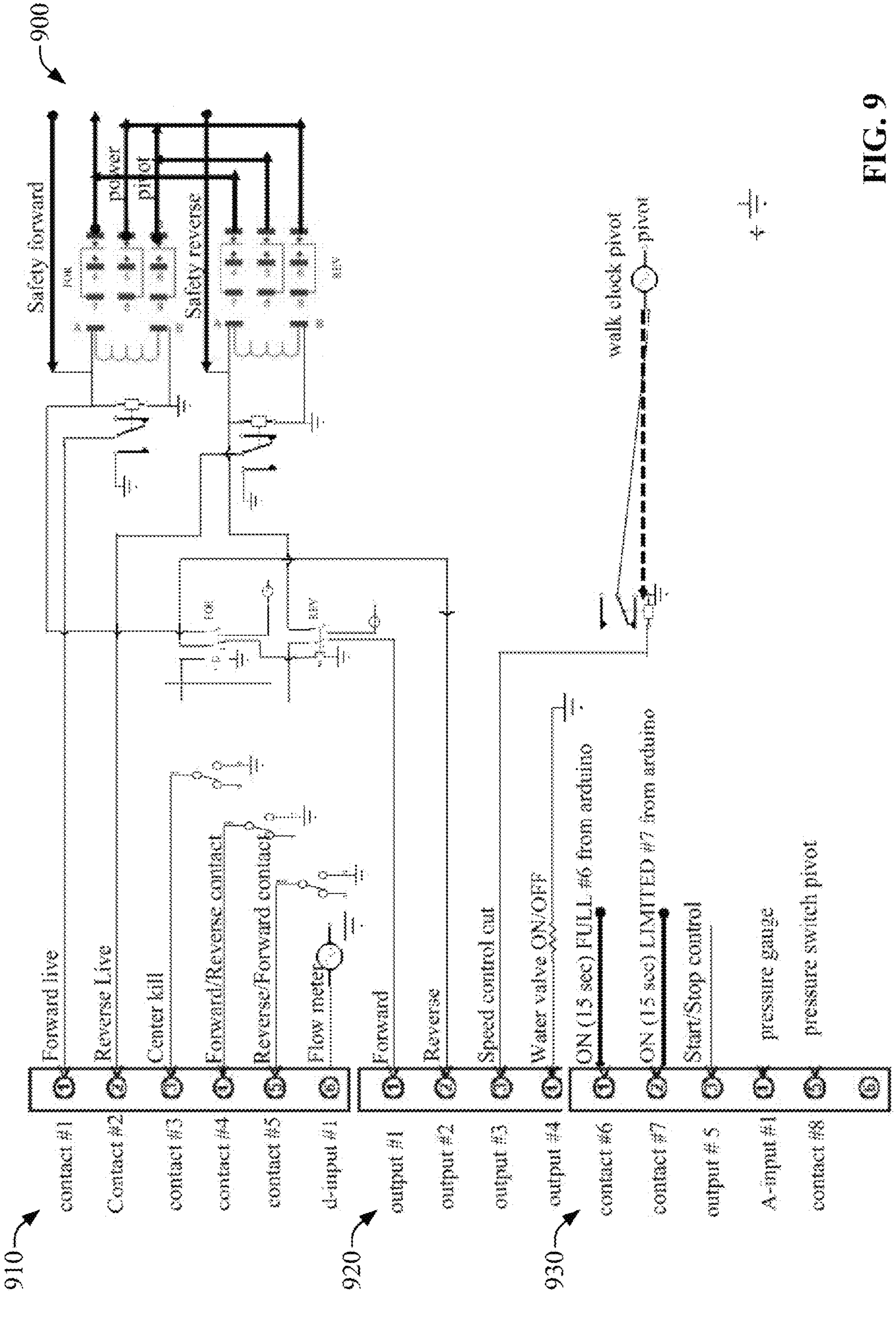
FIG. 9 illustrates an interface to a control unit that can regulate operation of an irrigation apparatus in accordance with one or more aspects of the disclosure.

FIG. 9 presents an example embodiment 900 of an interface to a control unit that can regulate operation of an irrigation apparatus in accordance with one or more aspects of the disclosure. In one aspect, the irrigation apparatus has electric operation. As illustrated, the interface includes three blocks of contacts associated with specific control functionality. Block 910 provides a set of contacts associated with safety features of a control protocol or control logic. In the illustrated embodiment, the irrigation apparatus can embody or can comprise a center pivot (see, e.g., FIG. 2), and the safety features can ensure that control logic applied to the center pivot can prevent two or more control instructions from directing the center pivot to move in opposite directions while the center pivot is moving. Block 920 provides a set of connectors that can permit output of several signals conveying information associated with operation of the center pivot, e.g., movement state, such as clockwise movement or counter-clockwise movement; movement speed; water supply state; such as water ON or OFF. Block 930 provides a set of connectors that can permit actuation of the center pivot. Thus, the block 930 can be referred to as "actuator block."

The following is an example of the program logic for control of an irrigation apparatus in a scenario in which the irrigation apparatus is a center pivot:

- Establish water need
  - Determine which zone needs watering
  - Confirm water capacity is available
  - Confirm is at the start point
- Turn water on to Pivot
  - Check that pressure is at set point
  - Check flow to make sure available
  - Power up pivot
  - Activate the correct direction to travel
- End of first pass of zone
  - Confirm adequate water was applied
    - If yes return dry or stop
    - If not reverse direction and apply water again
- Back to start position
  - Are all zones satisfied
    - If yes shut water and power off
    - If no move to needed zone and start back at line 1

One feature of the disclosure includes extensive collection and analyze of accurate, repeatable data. In certain implementations, the disclosed data process can map water uptake by plants roots in 4 inch increments within the soil. It should be appreciated that ETo-based water usage coefficients can be more accurate than predicted water usage relying on an applied-water methodology. How salt ions move in the soil is now becoming better understood. The result of applying chemicals to the crop and their effects on water uptake can be measured. Newly identified and commercialized crop varieties can have the water and fertilizer management characterized so that they can be optimized for specific agronomic conditions, eliminating the practice of testing and then using dated and inappropriate irrigation and fertility management. What if your new germplasm needs a new and different management practice . . . would your current discovery and development processes allow you to find them? The development of new germplasm that show water- and nutrient-use benefits needs the use of a measurement system with accurate instruments, correct installation, and robust data analysis. Described herein are systems and methods that benefit modern food production.

This technology is based on data collection from an array of precision monitoring instruments placed in and above the soil within the crop that collects data that is immediately analyzed, sending a trigger for an irrigation event when the soil moisture readings fall below the calculated appropriate deficit level (determined for the crop, variety and soil type from the analysis of the current data and similar data in an available database) and continues until the soil moisture level approaches the optimum ratio or nearly-optimum ration of soil water-to-air and the irrigation is stopped. In a field with two or more distinct soil types, in one aspect, the instrument array can be deployed in the soil type with the highest stress potential. In one aspect, since each plant in the crop can take up substantially the same amount of water and/or nutrients in a specific time interval (e.g., a day), soil type can be the primary factor affecting differences in water and nutrients uptake between two or more portions of soil.

In a soil having a soil type with less water stress potential, the soil moisture level also can decrease, but such level still can be above the allowable deficit and below the optimum ratio of soil-water to air, so an adequate moisture level can be maintained such soil as well. Yet, to reduce consumptive water use in a soil having a soil type with higher water stress potential, in a scenario in which water well capacity is adequate, a more sophisticated strategy can be implemented by placing additional array of precision monitoring instruments in the other soil types and only triggering irrigation events in a specific zone in response to the soil moisture being substantially equal or lower than the allowable deficit. In such scenario, irrigation in each zone irrigated by the center pivot can be triggered substantially independently.

In a scenario in which water supply can be limiting due to well capacity, the irrigation events can be ordered in a sequence directed to watering the soil with the highest water-stress potential first, followed by the progressively less water-stress potential soil zones (or sectors) until no further irrigation is triggered.

In response to termination of a sequence of irrigation events, the system then looks to the soil with the highest water-stress potential again to reinitiate another sequence of irrigation events, ensuring that the soils having the highest water-stress potential are replenished before the soils having the lower water-stress potential, in view that the latter can stand less frequent irrigations while the former cannot. With pivot irrigation, this must be accomplished by controlling the direction of the pivot (forward or reverse) as well as demarcating each radius that separates each "circular wedge" representing a soil with a specific water-stress potential (e.g., a soil having a specific soil texture). In one embodiment, the control unit 110 can cause (e.g., configure, actuate, configure and actuate) the pivot to move without delivery of water—referred to as "walk dry"—to another edge (or, more generally, boundary) in case a soil having less water-stress potential lies, for example, in between two soils having more water-stress potentials. In such scenario, only wedges needing water are irrigated, whereas the remaining wedges remain scheduled for water irrigation only when it is appropriate.

In certain scenarios, after or upon water management is implemented—e.g., the appropriate deficit levels have been determined and the irrigation timing (or irrigation schedule) has been configured in order to return water to the active root zone—, the disclosed systems and methods can permit fertility management of the soil. Such management, in one aspect, can be adjusted to feed a crop with essential nutrients at the proper timing without driving unused nutrients beyond the active root zone, recognizing that in light soils with lower nutrient holding capacities, soil nutrient replenishment is to occur throughout the season, rather than via a single, generally large, application of fertilizer at the beginning of a season.

Figure 7:
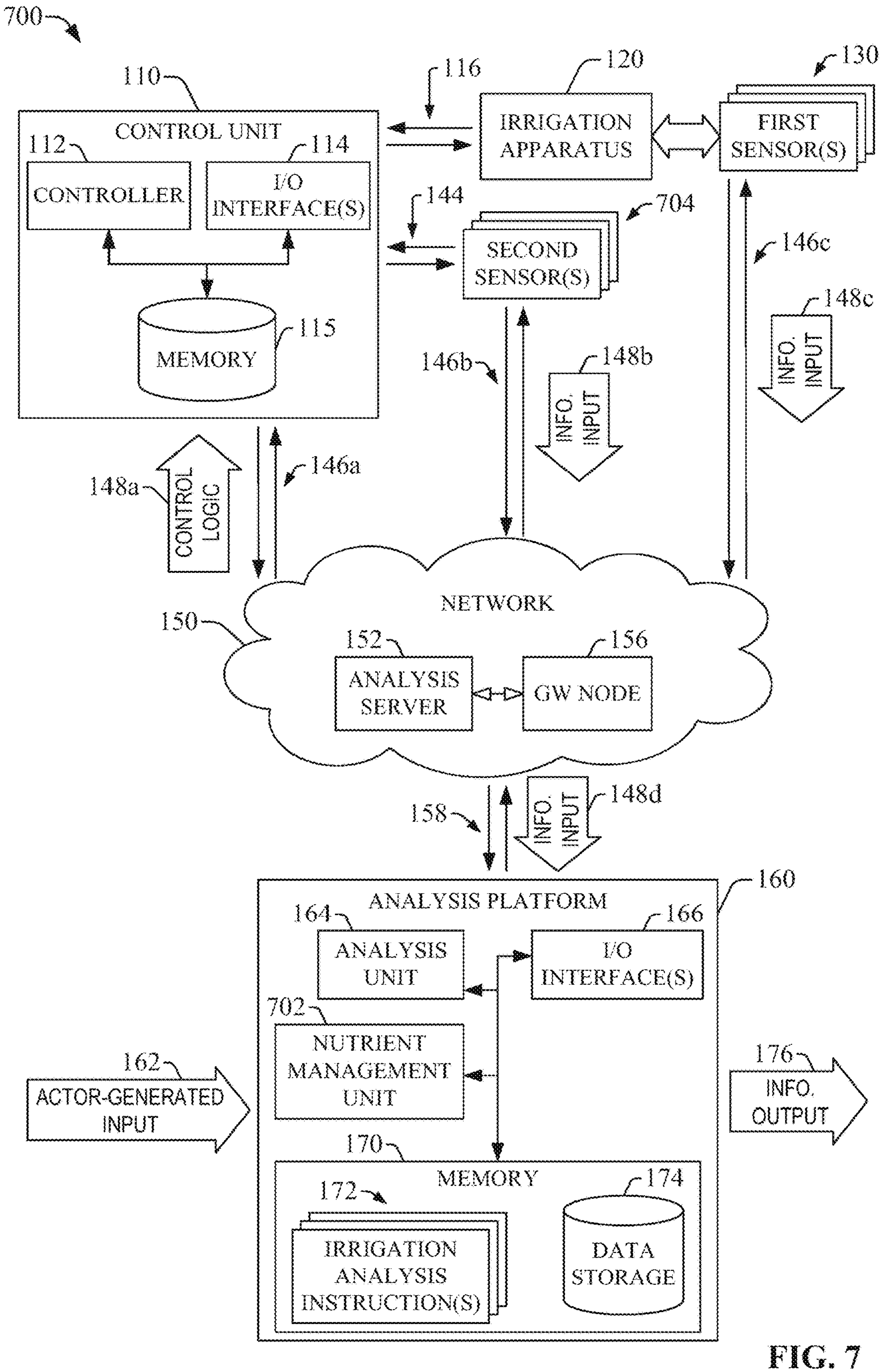
FIG. 7 illustrates an example system for nutrient management in a medium in accordance with one or more aspects of the disclosure.

FIG. 7 illustrates an example system 700 for nutrient management in a medium in accordance with one or more aspects of the disclosure. In one aspect, the example system 700 can comprise a set of one or more second sensors 704 that can permit measuring salt content. The one or more sensors can comprise a vertical sensor-array capacitance probe for salt measurement. In one embodiment, such probe can be contained or embodied in the sensor 260. In one aspect, such probe can contain a vertical sensor array dual-frequency probe that can measure not only soil water alone (for example, by using a high-frequency pulse of electromagnetic energy transmitted into the soil), but also the mixture of salts and water in the soil with a lower frequency pulse. The electronics on the probe can subtract the water-only content from the water-plus-salt content measurement to produce a calculation of the salt content of the soil. Salts are an intrinsic component of the soil generated either by mineral breakdown, by salts in irrigation water, or by fertilizer additions.

Information (e.g., data, metadata, and/or signaling) associated with salt content in the soil can be transmitted through telemetry, utilizing the network 150 and one or more network elements therein, such as the gateway (GW) node(s) 156 and the analysis server 152. In one implementation, a nutrient management unit 702 can receive and/or analyze such information. In one scenario in which the salt content of the soil does not increase after an irrigation event, analysis of the information can reveal that a grower does not have saline irrigation water. In another scenario in which the salt content increases after a fertilizer application, the one or more sensors 194 can measure such increase and the nutrient management unit 702 or other functional element of the analysis platform 160) can analyze such increase and establish trends, for example. In yet another scenario in which salts remain localized in an upper layer of the soil profile, analysis of the information associated with salt content can reveal that little or no leaching is occurring. In addition or in the alternative, in a scenario in which the salts decrease in the upper soil profile and increase in the lower layers, there is leaching occurring. Analysis of the salt transport information performed by the nutrient management unit 702 can reveal the presence of leaching. Moreover or as another alternative, if the salts decrease in the upper layers and do not appear (even transiently, for example) in the lower layers, then the crop is effectively extracting these salts and using the nutrients. As described herein, analysis of the salt transport information performed by the nutrient management unit 702 can reveal such effective utilization of nutrients.

Measurements of salt content afforded by the one or more sensors 704 can permit identification and generation of trends. For example, in a scenario in which salt content continues to rise over a season, the nutrient management unit 192 can draw the conclusion, through data analysis, that the level of nutrients in the soil is increasing since the crop is not utilizing all the nutrients that have been applied as fertilizer. It should be appreciated that such conclusion can represent a form of artificial intelligence afforded by the analysis platform 160. In addition or in the alternative, from information accessed from such measurements, the nutrient management unit 702 can extract or identify soil depths at which such phenomenon—nutrient increment—has occurred. In addition or in the alternative, in a scenario in which the salt ion content in the lower layers of the profile increases over the season, the nutrient management unit 702 can draw the conclusion, through data analysis, that water management practices are flushing salts from the upper layers in the soil profile before the crop can absorb the nutrients and/or that too many nutrients have been applied through fertilizer deposition. In one aspect, after a first season of analysis, measurement of specific ion species in the soil can be carried out in subsequent seasons.

In one embodiment, at least one sensor of the second sensor(s) 194 can enable measuring ion specificity for ions derived from presence of one or more salts. Such measurements can identify one or more salts tracked by the salt measurements of other sensor(s) of the one or more sensors 194. As part of strategy for nutrient management, a plurality of devices (e.g., a subset of two or more of the sensors 194) can be installed, for example, in the soil profile at depths identified in the previous season's monitoring, in order to collect soil water samples. In one embodiment, each device of the plurality of devices can comprise porous ceramic spheres that can hold a vacuum and can draw soil water into the center of each sphere. Water contained in such spheres can be removed and submitted for analysis in the laboratory for specific ions. In certain deployments the second sensor(s) 704 can be substantially the same as second sensors 140.

In one aspect, the depths at which such plurality of sampling devices can be deployed can be based at least on the depths at which salts have accumulated in the past (e.g., utilizing historical data retained in the memory 174, for example, in data storage 174) or at depths where salt is currently accumulating. In one aspect, such regions can be either within or below the zone in the soil where roots are extracting water, as the analysis unit 164 contained in the analysis platform 160 can monitor water movement and root activity in subsequent seasons. This allows the grower/scientist to understand whether specific nutrients, such as nitrate, phosphate, or potassium, (or any other water soluble element(s) found in soil) are moving out of the zones where the crop can utilize them into zones where roots do not take up appreciable water. As described herein, in one implementation, at least one sensor of the one or more sensor(s) 140 (e.g., soil-water collection devices) can draw water from roughly a four-inch band of soil, and can accumulate enough soil water for testing of multiple analytes. While water volume collected in one or more of the devices that permit ion specificity measurements can be limited when the soil water content is restricted, and sampling can be labor-intensive, the use of instruments for moisture detection and analysis of collected extracted water can be complementary and can permit developing definitive picture (via data analysis and visualization, for example) of nutrient movement in the soil profile, assisting the grower/scientist to know when and how much fertilizer to apply, and when irrigation practices (or rain events) cause the loss of nutrients from the layers in the soil where the crop can access them. In one implementation, the analysis platform can supply information indicative of absorption of specific nutrients (e.g., a nitrate) in a specific soil portion. The latter can permit determining when and where a plant is consuming nutrients, and what specific nutrients are being consumed.

In addition to tracking the movement of salts in general and specific nutrients in particular as discussed above, there are additional methodologies that can assist the grower in the timing of his fertilizer applications. In general, crops respond to nitrogen levels in the soil by varying the concentration of chlorophyll in their foliage. Crops that lack chlorophyll are lighter green, and the lack of chlorophyll limits the ability of the leaf to "fix carbon" (e.g., produce carbohydrate). Lower levels of carbohydrate production limit the ability of the crop to build strong stems (for structural support), more roots (for water and mineral acquisition, for example), and fuller fruits and seeds (for harvestable commodities and vigorous seedlings in subsequent generations). The green color can be quantified and measured in real-time. In certain embodiments, this can be accomplished using boom-mounted devices on fertilizer spreaders or liquid applicators, the systems and methods of the disclosure can permit developing a pivot-mounted approach to sense the condition of the crop (and the need for additional nitrogen, for example) and then deliver nitrogen by way of a variable-rate injector to introduce nitrogen-based fertilizers into the pivot boom. However, one problem with conventional technology is it typically probes at the reflected color and makes a call on the amount of nitrogen to apply without any reference to the soil's nutrient holding capacity. The disclosed systems and methods can implement such adjustments to permit this nutrient-holding capacity factor to be considered in conjunction with this technology. The delivery of nitrogen fertilizer to the crop will take place by several ways, one will be by direct injection of fertilizer solution into the boom of the pivot for a uniform delivery of a single rate of fertilizer for the crop. Variations of the reflected color will be minimized by averaging the reading over the length of the pivot, and the resulting delivery of a rate of nitrogen will be determined using the average reflected color. For a more targeted delivery of fertilizer at variable rate (both across each span as well as across the path traversed by each sensor), we envision the use of a separate delivery system for the fertilizer solution to each individual nozzle on the pivot, with fertilizer injected into each drop line from the boom to the nozzle via a T-connector that allows the injection when a valve is opened in response to a change in the reflected color. In this way, smaller subsets of the crop in the field can be fertilized according to the deficiency identified by the optical sensor. With an increase in sensors along the pivot span, smaller subsets of the field population can be fertilized "individually" by the drop nozzles that are controlled by the software served by the sensor. To account for variations in pressure along both the fertilizer delivery pipes that run to the nozzles and on the boom itself (which delivers the water into which the fertilizer is injected), metering orifices can be installed within the delivery lines. This approach provides an additional component to crop-controlled irrigation and extends the concept to a total crop-controlled input-management system.

The following outline represents exemplary precise sensor placement, which increases the quality of data collection within the agricultural sector.

Figure 10:
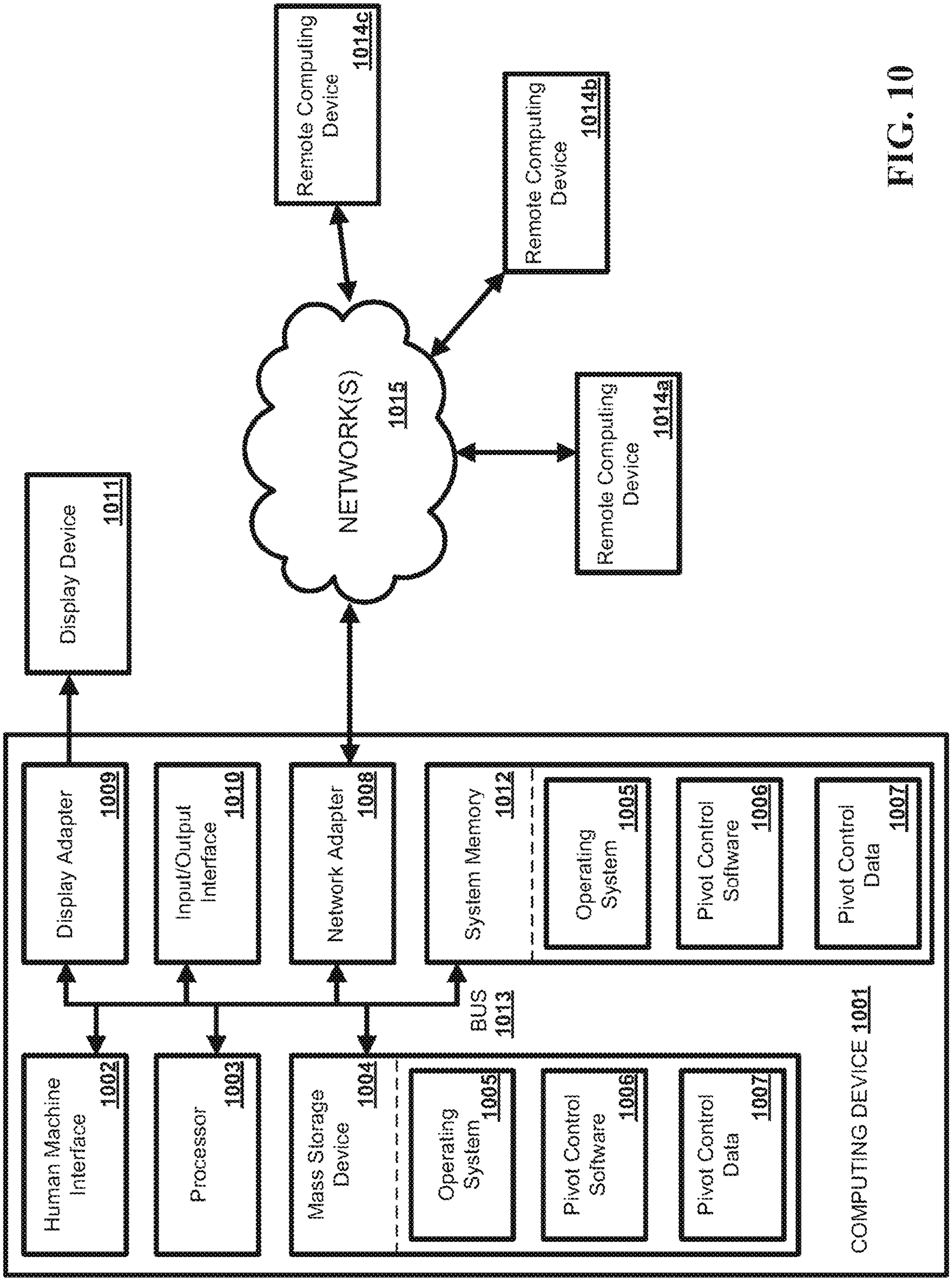
FIG. 10 is a block diagram illustrating an exemplary operating environment for performing the disclosed methods and enabling implementation of functionality of the disclosed systems in accordance with one or more aspects.

Center Pivot
- Soil map
- Used to find majority soil type
- Best drained if substantial
- Inside either of the last two spans from pivot point
  - Uniformity test needed to position sensor
  - Crop data base needed to position where in rows It should be appreciated that what has been provided is a functional description and that the respective functions can be performed by software, hardware, or a combination of software and hardware. FIG. 10 is a block diagram illustrating an exemplary operating environment for performing the disclosed methods and enabling implementation of functionality of the disclosed systems in accordance with one or more aspects. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The disclosed methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods also can be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 1001. The components of the computer 1001 can comprise, but are not limited to, one or more processors or processing units 1003, a system memory 1012, and a system bus 1013 that couples various system components including the processor 1003 to the system memory 1012. In the case of multiple processing units 1003, the system can utilize parallel computing.

The system bus 1013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1013, and all buses specified in this description can also be implemented over a wired or wireless network connection and each of the subsystems, including the processor 1003, a mass storage device 1004, an operating system 1005, analysis software 1006, pivot control data 1007, a network adapter 1008, system memory 1012, an Input/Output Interface 1010, a display adapter 1009, a display device 1011, and a human machine interface 1002, can be contained within one or more remote computing devices 1014*a,b,c* at physically separate locations, connected through buses of this form, in effect implementing a fully distributed system.

The computing device 1001 typically comprises a variety of computer readable media. Exemplary readable media can be any available media that is accessible by the computing device 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as pivot control data 1007 and/or program modules such as operating system 1005 and analysis software 1006 that are immediately accessible to and/or are presently operated on by the processing unit 1003.

In another aspect, the computing device 1001 can also comprise other removable/non-removable, volatile/non-volatile computer storage media. By way of example, FIG. 10 illustrates a mass storage device 1004 which can provide non-volatile storage of computer code, computer readable instructions, data structures, program modules, and other data for the computing device 1001. For example and not meant to be limiting, a mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1004, including by way of example, an operating system 1005 and analysis software 1006. Each of the operating system 1005 and analysis software 1006 (or some combination thereof) can comprise elements of the programming and the analysis software 1006. Pivot control data 1007 can also be stored on the mass storage device 1004. Examples of environmental data include, but are not limited to, nitrates in water, salt in water, chlorine in water and ozone in air. Pivot control data 1007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 1001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 1003 via a human machine interface 1002 that is coupled to the system bus 1013, but can be connected by other interface and bus structures, such as a parallel port, game port, an IEEE 1394 Port (also known as a Firewire port), a serial port, or a universal serial bus (USB).

In yet another aspect, a display device 1011 can also be connected to the system bus 1013 via an interface, such as a display adapter 1009. It is contemplated that the computing device 1001 can have more than one display adapter 1009 and the computing device 1001 can have more than one display device 1011. For example, a display device can be a monitor, an LCD (Liquid Crystal Display), or a projector. In addition to the display device 1011, other output peripheral devices can comprise components such as speakers (not shown) and a printer (not shown) which can be connected to the computing device 1001 via Input/Output Interface 1010. Any step and/or result of the methods can be output in any form to an output device. Such output can be any form of visual representation and/or aural representation, including, but not limited to, one or more of textual, graphical, animation, audio, tactile, and the like.

The computing device 1001 can operate in a networked environment using logical connections to one or more remote computing devices 1014*a,b,c*. By way of example, a remote computing device can be a personal computer, portable computer, a server, a router, a network computer, a peer device or other common network node, and so on. Logical connections between the computing device 1001 and a remote computing device 1014*a,b,c* can be made via a local area network (LAN) and a general wide area network (WAN). Such network connections can be through a network adapter 1008. A network adapter 1008 can be implemented in both wired and wireless environments. Such networking environments are conventional and commonplace in offices, enterprise-wide computer networks, intranets, and the network(s) 1015.

For purposes of illustration, application programs and other executable program components such as the operating system 1005 are illustrated herein as discrete blocks, although it is recognized that such programs and components reside at various times in different storage components of the computing device 1001, and are executed by the data processor(s) of the computer. An implementation of analysis software 1006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 11:
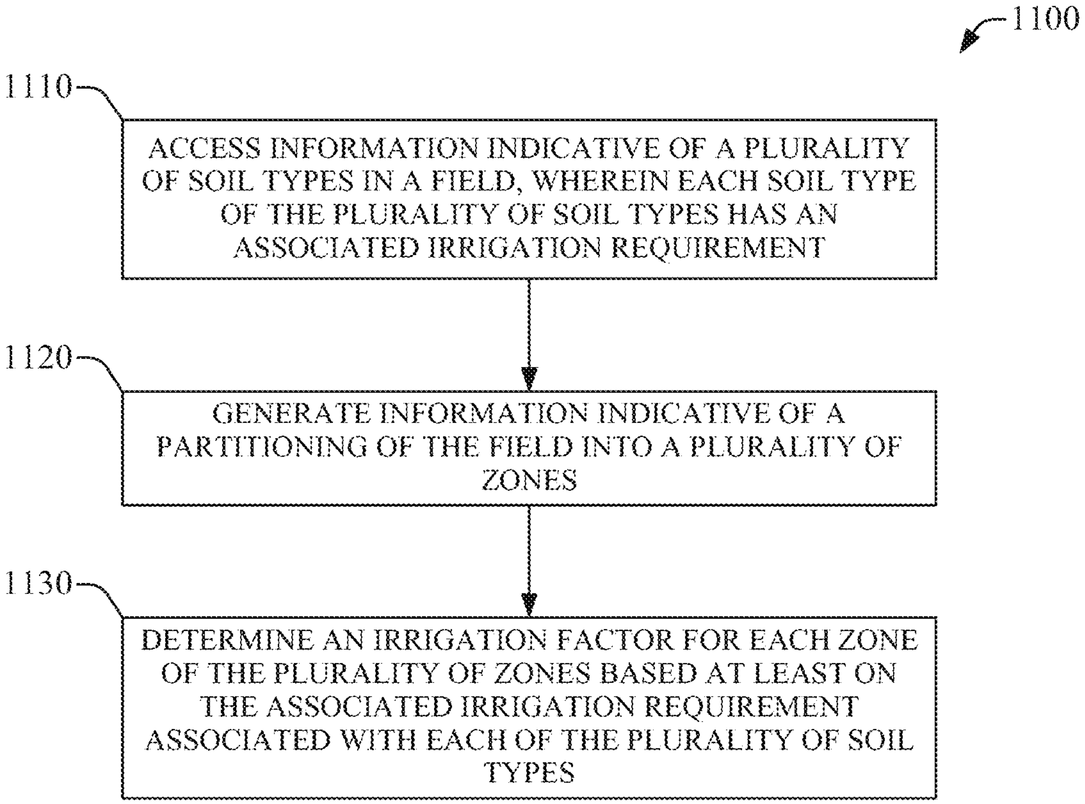
FIGS. 11-17 illustrates example methods for soil nutrient management in accordance with one or more aspects of the disclosure.

FIG. 11 illustrates a flowchart of an example method 1100 for automated field irrigation in accordance with one or more aspects of the disclosure. In one aspect, a computing device (e.g., analysis platform 160) or one or more functional elements therein can perform (e.g., execute) the example method 1100. In certain embodiment, another computing device (e.g., the control unit 210) can implement (e.g., execute). At block 1110, information indicative of the a plurality of soil types in a field is accessed. In one aspect, each soil type of the plurality of soil types has an associated irrigation requirement. At block 1120, information indicative of a partitioning of the field into a plurality of zones is generated. In one aspect, generating the information indicative of the partitioning of the field comprises computing an area for each zone of the plurality of zones. In another aspect, generating the information indicative of the partitioning of the field comprises computing an area of the at least one zone of the plurality of zones. In one aspect, determining the irrigation factor for each zone of the plurality of zones comprises determining an irrigation sequence order for each zone of the plurality of zones. In one aspect, determining the irrigation sequence order comprises determining a trigger soil moisture percentage for each soil type of the plurality of soil types.

In another aspect, determining the irrigation sequence order further comprises determining a field capacity soil moisture percentage for each soil type of the plurality of soil types. In yet another aspect, determining the irrigation sequence order further comprises determining a net change in moisture percentage for each zone of the plurality of zones, wherein the net change in the moisture percentage is determined by a difference between a current soil moisture percentage at the active root zone in each zone and a field capacity soil moisture percentage in each zone. In still another aspect, determining the net change in moisture percentage for each zone comprises measuring soil moisture level for at least one soil type of the plurality of soil types. In one aspect, determining the irrigation sequence order further comprises determining an irrigation demand ratio for each zone of the plurality of zones, wherein the irrigation demand ratio is determined by the difference between the field capacity soil moisture percentage and the trigger soil moisture percentage divided by the net change in moisture percentage.

At block 1130, an irrigation factor (e.g., irrigation initiation event, duration of the irrigation event, etc.) is determined for each zone of the plurality of zones based at least on the associated irrigation requirement associated with each of the plurality of soil types. In one aspect, determining the irrigation factor for each zone of the plurality of zones comprises generating a schedule for irrigation of at least one of the plurality of soil types.

In certain embodiments of the, the example method 1100 can comprise irrigating the field according to an irrigation configuration resulting from configuring the irrigation of the field. In one aspect, irrigating the field according to the irrigation configuration comprises moving an irrigation apparatus while releasing water. In another aspect, irrigating the field according to the irrigation configuration further comprises moving the irrigation apparatus without releasing water. In one aspect, moving the irrigation apparatus without releasing water comprises moving the irrigation apparatus to a zone of the plurality of zones prior to the zone reaching a moisture trigger point for irrigation.

In certain embodiments (see, e.g., FIG. 2), the irrigation apparatus is a center pivot. In one aspect, generating the information indicative of the partitioning of the field can comprise determining, for each zone of the plurality of zones, a length of an arc on a circumference determined by the center pivot, and wherein the arc demarcates an initial boundary of a zone of the plurality of zones and a terminal boundary of the zone. In another aspect, generating the schedule for irrigation of at least one of the soil types comprises determining a spatio-temporal pattern of irrigation of the plurality of zones. In yet another aspect, generating the schedule for irrigation of at least one of the soil types comprises determining an initial irrigation event and an irrigation duration (e.g., a time during which water is released by an irrigation apparatus). In one aspect, determining the irrigation sequence order further comprises assigning an irrigation priority to each zone according to the irrigation demand ratio, wherein a higher irrigation priority is assigned to a higher irrigation demand ratio.

Figure 12:
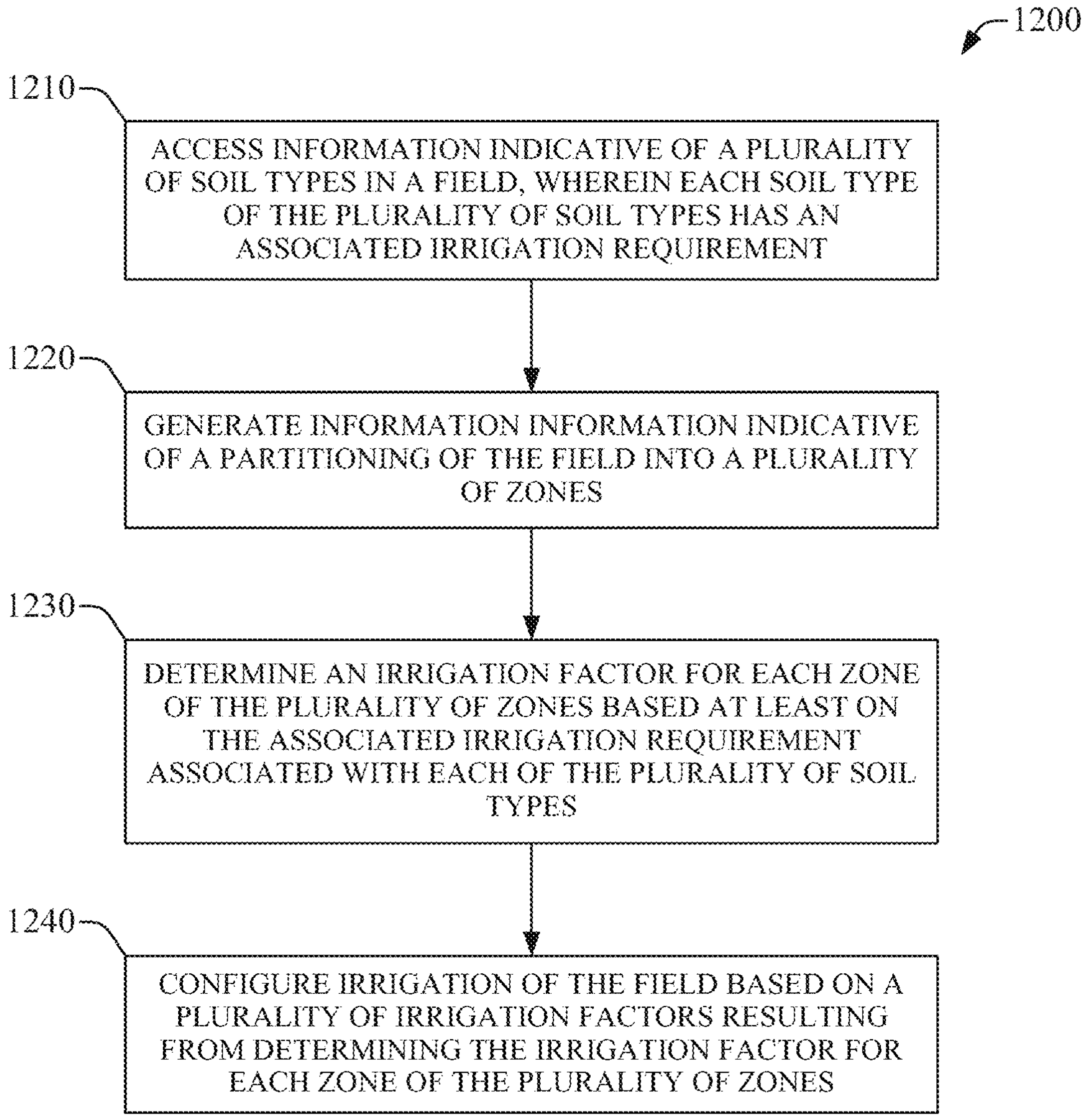

FIG. 12 illustrates a flowchart of an example method 1200 for automated field irrigation in accordance with one or more aspects of the disclosure. In one aspect, the computing device (e.g., analysis platform 160) or the one or more functional elements therein that can perform the example method 1100 also can perform the example method 1100. Implementation of blocks 1210-1230 is substantially the same as implementation of blocks 1110-1130. At block 1240, irrigation of the field is configured based at least on a plurality of irrigation factors resulting from determining the irrigation factor for each zone of the plurality of zones. In one aspect, configuring the irrigation of the field can comprise providing control logic (such as one or more computer-executable instructions) to a computing device (e.g., control unit 110) that can control an irrigation apparatus (such as a center pivot, as illustrated in FIG. 2)

Figure 13:
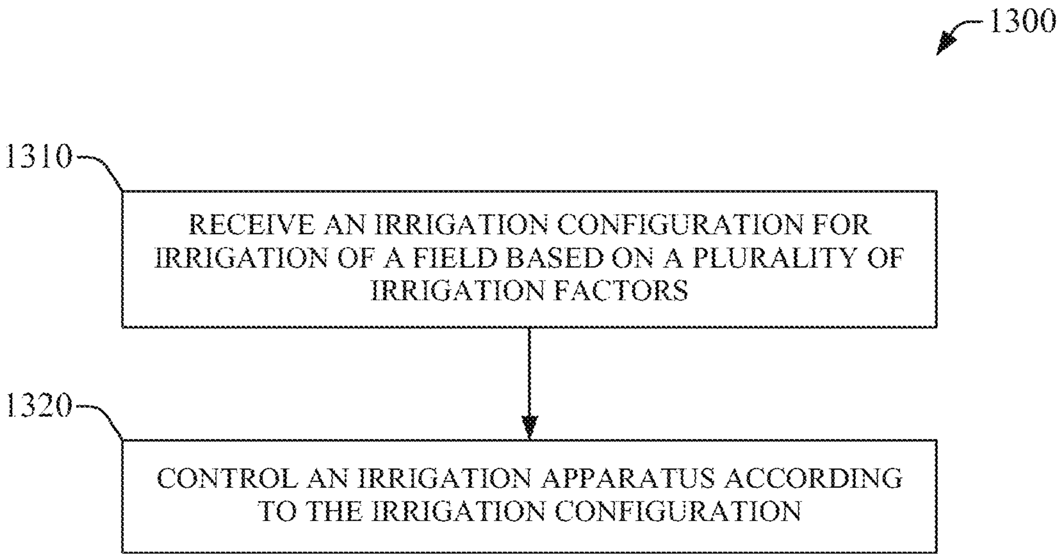

FIG. 13 illustrates a flowchart of an example method 1300 for automated field irrigation in accordance with one or more aspects of the disclosure. In one aspect, a computing device (e.g., control unit 160) or the one or more functional elements therein can perform the example method 1300. At block 1310, the an irrigation configuration is received for irrigation of a field based on a plurality of irrigation factors. In one aspect, the irrigation factors can be associated with one or more zones in a plurality of zones partitioning a soil field having a plurality of soil types. At block 1320, an irrigation apparatus (e.g., a center pivot) can be controlled in accordance with the irrigation configuration. In one aspect, controlling the irrigation apparatus can include causing the irrigation apparatus to move while releasing water according to the irrigation configuration. In another aspect, controlling the irrigation apparatus can include causing the irrigation apparatus to move without releasing water. In another aspect, causing the irrigation apparatus to move (e.g., actuating the irrigation apparatus) without releasing water can comprise causing the irrigation apparatus to move to a zone of a plurality of zones (e.g., see FIG. 5 or FIG. 6) prior to the zone reaching a moisture trigger point for irrigation. The plurality of zones can partition a soil field that is to be irrigated. In one aspect, the irrigation apparatus can be a center pivot (see, e.g., FIG. 2). In such scenario, each zone of the plurality of zones can be defined by a length of an arc on a circumference determined by the center pivot, and wherein the arc demarcates an initial boundary of a zone of the plurality of zones and a terminal boundary of the zone.

Figure 14:
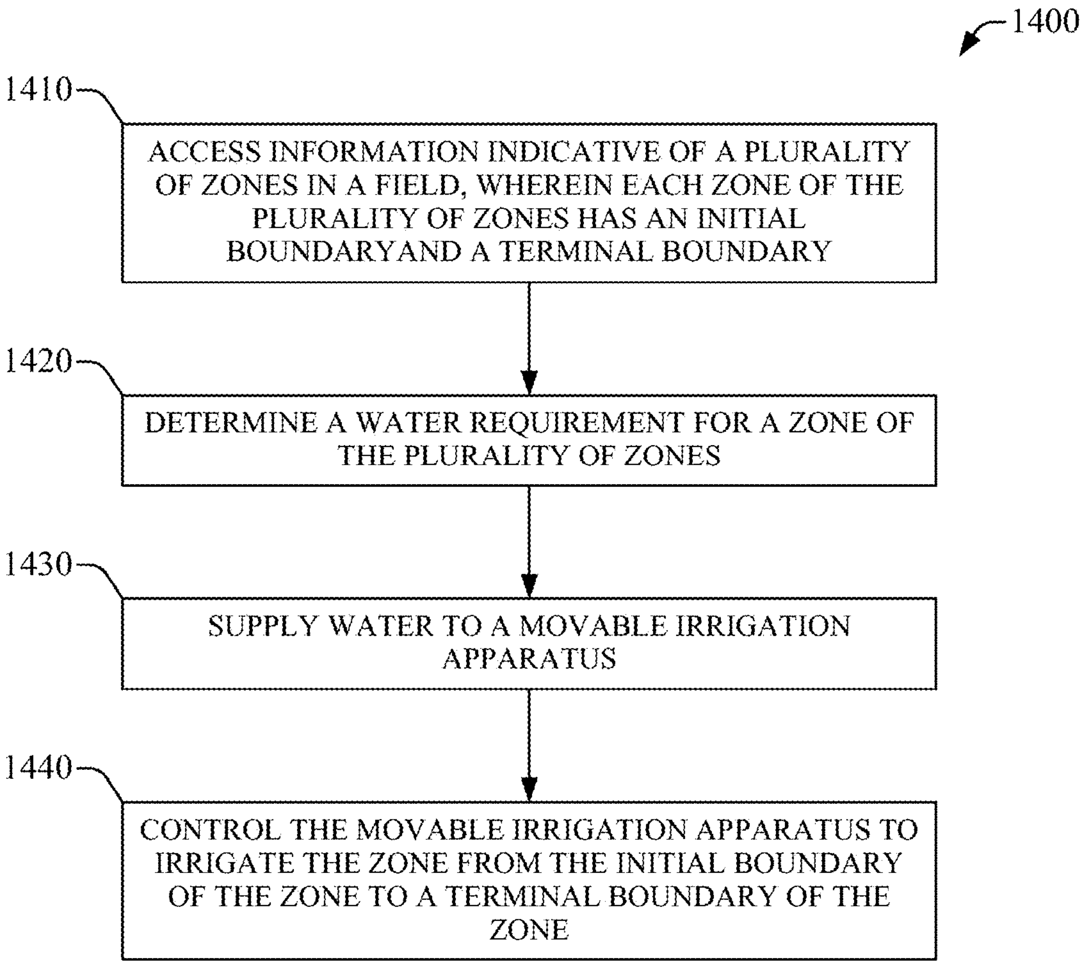

FIG. 14 illustrates a flowchart of an example method 1400 for automated field irrigation in accordance with one or more aspects of the disclosure. In one aspect, a computing device (e.g., control unit 110) or one or more functional elements therein can perform the example method 1400. At block 1410, information indicative of a plurality of zones in a field is accessed (e.g., received or acquired). In one aspect, each zone of the plurality of zones has an initial boundary and a terminal boundary. At block 1420, a water requirement can be determined for a zone of the plurality of zones. In one aspect, the water requirement can be based at least on a net change in moisture percentage for each zone of the plurality of zones, wherein the net change in the moisture percentage can be determined by a difference between a current soil moisture percentage at the active root zone (e.g., a region located at 8 inches under the soil surface) in each zone of the plurality of zones and a field capacity (FC) soil moisture percentage in each zone of the plurality of zones. At block 1430, water is supplied to a movable irrigation apparatus (e.g., a center pivot). In one aspect, the amount of water that is supplied can be based at least on the water requirement determined at block 1320. At block 1440, the movable irrigation apparatus is controlled in order to irrigate the zone from the initial boundary of the zone to a terminal boundary of the zone.

Figure 15:
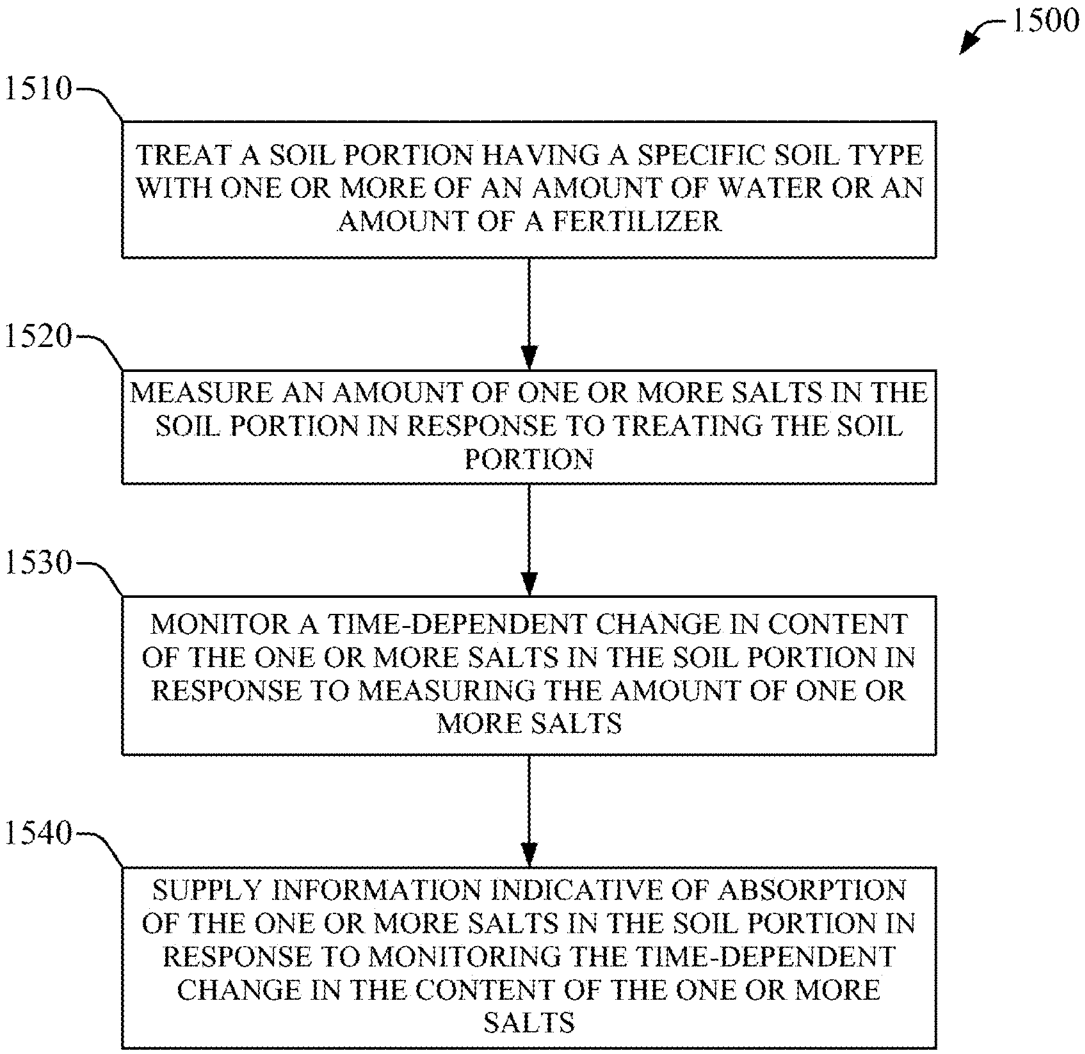

FIG. 15 illustrates a flowchart of an example method 1500 for nutrient management in accordance with one or more aspects of the disclosure. At block 1510, a soil portion having a specific soil type can be treated with one or more of an amount of water or an amount of a fertilizer. In one aspect, treating the soil with an amount of water comprises irrigating the soil portion. At block 1520, an amount of one or more salts in the soil portion can be measured in response to treating the soil portion. In one aspect, measuring the amount of the one or more salts can comprise measuring an amount of at least one of a nitrate, a phosphate, or potassium. In another aspect, measuring the measuring the amount of the one or more salts can comprise measuring an amount of at least one water soluble element present in the soil portion. In yet another aspect, measuring the amount of the one or more salts can comprise probing a mixture of salts and water in the soil portion, yielding data indicative of a water-plus-salt content in the soil portion. In certain embodiments, probing the mixture of salts and water in the soil portion can comprise measuring an amount of the mixture at one or more depths in the soil portion.

At block 1530, a time-dependent change in content of the one or more salts in the soil portion can be measured in response to treating the soil portion. At block 1540, information indicative of absorption of the one or more salts in the soil portion can be supplied in response to monitoring the time-dependent change in the content of the one or more salts. In one aspect, measuring the amount of the one or more salts further can comprise subtracting a water content from the water-plus-salt content in the soil portion, yielding the amount of the one or more salts in the soil portion.

Figure 16:
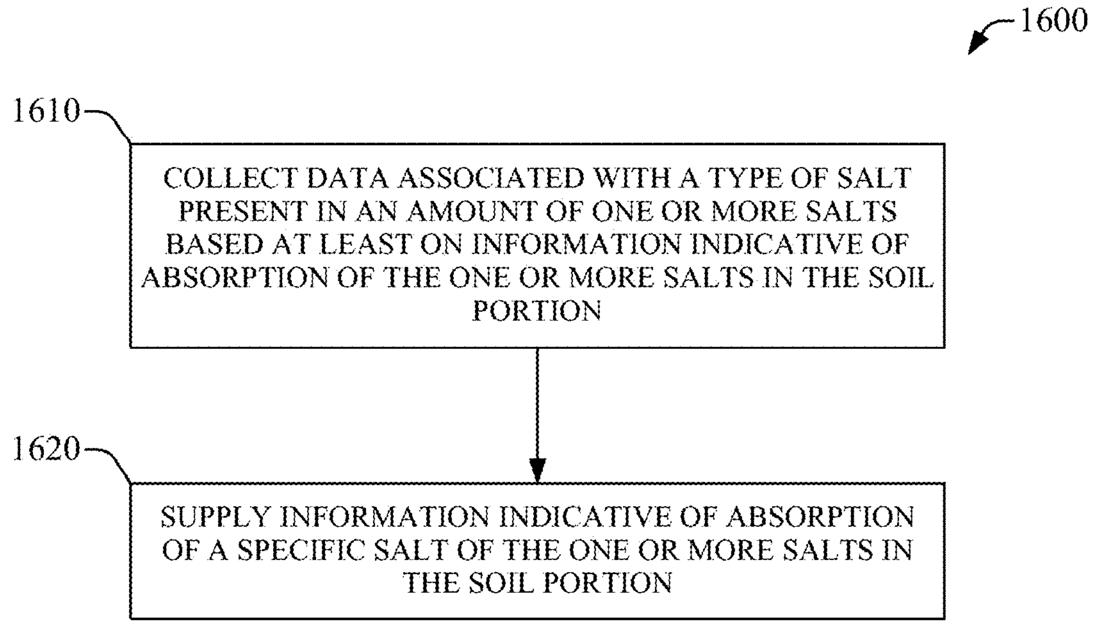
Figure 17:
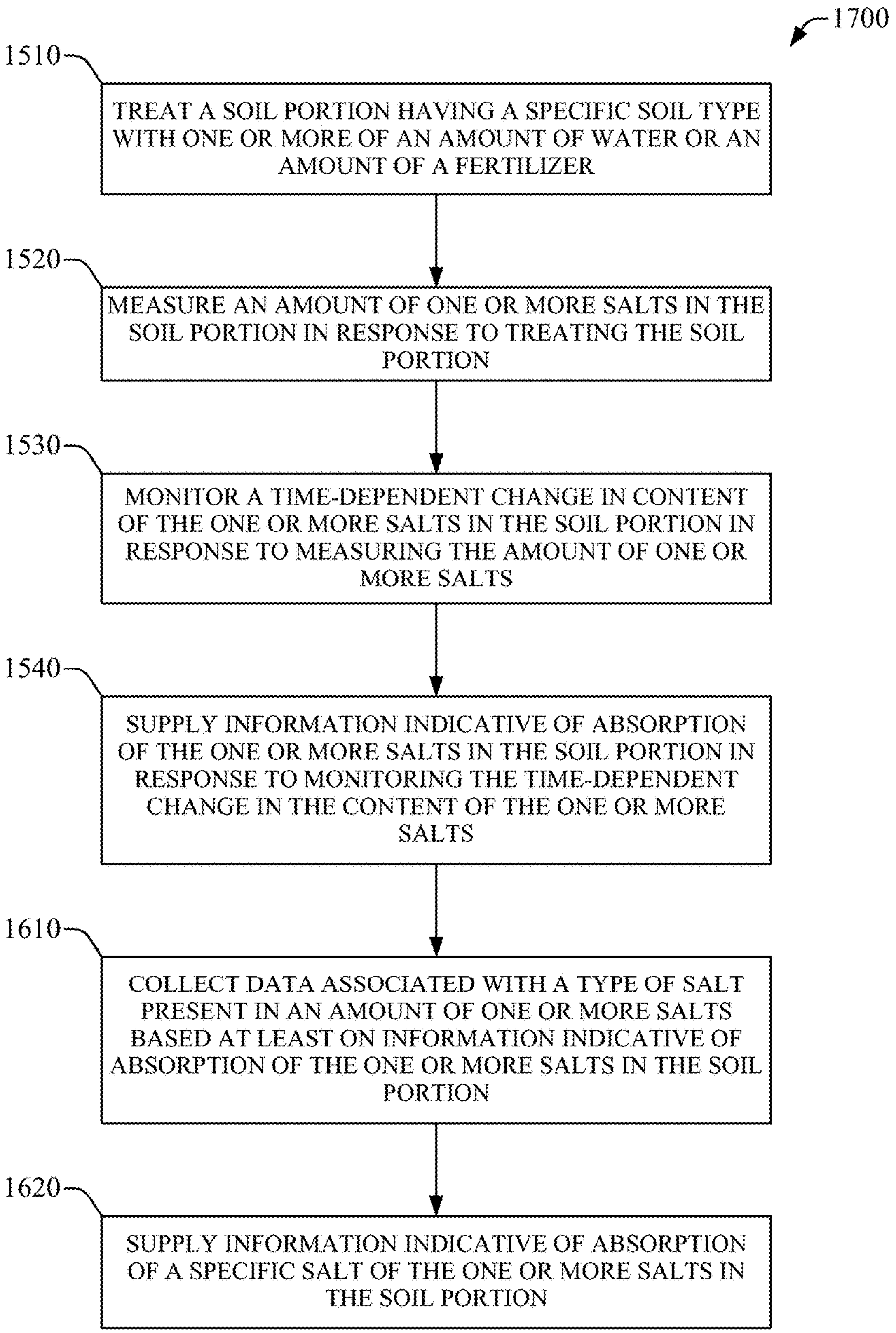

FIG. 16 illustrates a flowchart of an example method 1600 for nutrient management in accordance with one or more aspects of the disclosure. In one aspect, the computing device (e.g., analysis platform 160) or the one or more functional elements therein that can perform the example method 1600 also can perform the example method 1600. At block 1610, data associated with a type of salt present in an amount of one or more salts based at least on information indicative of absorption of the one or more salts in the soil portion. In one aspect, collecting the data associated with the type of salt present in the amount of the one or more salts comprises extracting an amount of salts and water with a probe placed at a predetermined depth in the soil portion. In another aspect, collecting the data associated with the type of salt present in the amount of the one or more salts can comprise extracting an amount of salts and water with a plurality of probes (e.g., probes 260) placed at a predetermined sub-surface region in the soil portion. At block 1620, information indicative of absorption of a specific salt of the one or more salts in the soil portion is supplied. In one aspect such information can be delivered as a report, which can be included in information output 176. In another aspect, the information indicative of absorption of a specific salt can be conveyed in a data structure transmitted in digital from. As illustrated in FIG. 17, in certain embodiments, the example methods 1500 and 1600 can be combined to generate an additional or alternative example method for soil nutrient management.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:

causing, via a probe placed at a depth in a soil portion, an extraction of an amount of salts and water from the soil portion;

determining, based on the extraction of the amount of salts and water, data indicative of an amount of one or more salts in the soil portion;

determining, based on the amount of the one or more salts in the soil portion, a time-dependent change in content of the one or more salts in the soil portion; and causing, based on the time-dependent change in content of the one or more salts, output of information indicative of absorption of the one or more salts in the soil portion.

2. The method of claim 1, further comprising causing a treatment of the soil portion with one or more of an amount of water or an amount of a fertilizer prior to the extraction of the amount of salts and water from the soil portion, wherein the soil portion comprises a soil type.

3. The method of claim 1, wherein determining the data indicative of the amount of one or more salts in the soil portion comprises determining an amount of at least one of a nitrate, a phosphate, or potassium.

4. The method of claim 1, wherein determining the data indicative of the amount of one or more salts in the soil portion comprises determining an amount of at least one water soluble element present in the soil portion.

5. The method of claim 1, wherein determining the data indicative of the amount of one or more salts in the soil portion comprises probing a mixture of salts and water in the soil portion, yielding data indicative of a water-plus-salt content in the soil portion.

6. The method of claim 5, wherein probing the mixture of salts and water in the soil portion comprises measuring an amount of the mixture at one or more depths in the soil portion.

7. The method of claim 5, wherein determining the data indicative of the amount of the one or more salts in the soil portion further comprises subtracting a water content from the water-plus-salt content in the soil portion, yielding the amount of the one or more salts in the soil portion.

8. The method of claim 1, further comprising determining, based on the information indicative of absorption of the one or more salts in the soil portion, data associated with a type of salt present in the amount of the one or more salts.

9. The method of claim 1, wherein causing, via the probe placed at the depth in the soil portion, the extraction of the amount of salts and water from the soil portion comprises causing, via a plurality of probes placed at a predetermined sub-surface region of the soil portion, the extraction of the amount of salts and water from the soil portion.

10. The method of claim 1, wherein the probe comprises a capacitance soil moisture probe.

11. An apparatus comprising:

one or more processors; and a memory storing processor-executable instructions that, when executed by the one or more processors, cause the apparatus to:

cause, via a probe placed at a depth in a soil portion, an extraction of an amount of salts and water from the soil portion;

determine, based on the extraction of the amount of salts and water, data indicative of an amount of one or more salts in the soil portion;

determine, based on the amount of the one or more salts in the soil portion, a time-dependent change in content of the one or more salts in the soil portion; and cause, based on the time-dependent change in content of the one or more salts, output of information indicative of absorption of the one or more salts in the soil portion.

12. The apparatus of claim 11, wherein the processor-executable instructions, when executed by the one or more processors, further cause the apparatus to cause a treatment of the soil portion with one or more of an amount of water or an amount of a fertilizer prior to the extraction of the amount of salts and water from the soil portion, wherein the soil portion comprises a soil type.

13. The apparatus of claim 11, wherein the processor-executable instructions that, when executed by the one or more processors, cause the apparatus to determine the data indicative of the amount of one or more salts in the soil portion, further cause the apparatus to determine an amount of at least one of a nitrate, a phosphate, or potassium.

14. The apparatus of claim 11, wherein the processor-executable instructions that, when executed by the one or more processors, cause the apparatus to determine the data indicative of the amount of one or more salts in the soil portion, further cause the apparatus to determine an amount of at least one water soluble element present in the soil portion.

15. The apparatus of claim 11, wherein the processor-executable instructions that, when executed by the one or more processors, cause the apparatus to determine the data indicative of the amount of one or more salts in the soil portion, further cause the apparatus to probe a mixture of salts and water in the soil portion, yielding data indicative of a water-plus-salt content in the soil portion.

16. The apparatus of claim 15, wherein the processor-executable instructions that, when executed by the one or more processors, cause the apparatus to probe the mixture of salts and water in the soil portion, further cause the apparatus to measure an amount of the mixture at one or more depths in the soil portion.

17. The apparatus of claim 15, wherein the processor-executable instructions that, when executed by the one or more processors, cause the apparatus to determine the data indicative of the amount of the one or more salts in the soil portion, further cause the apparatus to subtract a water content from the water-plus-salt content in the soil portion, yielding the amount of the one or more salts in the soil portion.

18. The apparatus of claim 11, wherein the processor-executable instructions, when executed by the one or more processors, further cause the apparatus to determine, based on the information indicative of absorption of the one or more salts in the soil portion, data associated with a type of salt present in the amount of the one or more salts.

19. The apparatus of claim 11, wherein the processor-executable instructions that, when executed by the one or more processors, cause the apparatus to cause, via the probe placed at the depth in the soil portion, the extraction of the amount of salts and water from the soil portion, further cause the apparatus to cause, via a plurality of probes placed at a predetermined sub-surface region of the soil portion, the extraction of the amount of salts and water from the soil portion.

20. The apparatus of claim 11, wherein the probe comprises a capacitance soil moisture probe.

* * * * *